United States Patent
Fukumura et al.

[11] Patent Number: 5,765,657
[45] Date of Patent: Jun. 16, 1998

[54] TRACTION CONTROL SYSTEM FOR AUTOMOTIVE VEHICLES

[75] Inventors: Tomohiro Fukumura, Yokohama; Hitoshi Ono, Yokosuka, both of Japan

[73] Assignee: Nissan Motor Co., Ltd., Kanagawa, Japan

[21] Appl. No.: 567,590

[22] Filed: Dec. 5, 1995

[30]    Foreign Application Priority Data

Dec. 7, 1994  [JP]  Japan .................. 6-303800

[51] Int. Cl.$^6$ ........................................ B60K 28/16
[52] U.S. Cl. ............................ 180/197; 364/426.031
[58] Field of Search .................. 180/197; 364/424.083, 364/426.031, 426.029; 123/336

[56]           References Cited

U.S. PATENT DOCUMENTS

| | | | |
|---|---|---|---|
| 5,003,481 | 3/1991 | Matsuda | 364/426.02 |
| 5,018,595 | 5/1991 | Hara et al. | 180/197 |
| 5,022,483 | 6/1991 | Tsuyama et al. | 180/197 |
| 5,047,940 | 9/1991 | Onaka et al. | 180/197 X |
| 5,070,960 | 12/1991 | Nobumoto et al. | 180/197 |
| 5,082,081 | 1/1992 | Tsuyama et al. | 180/197 |
| 5,168,950 | 12/1992 | Krusche | 180/197 |
| 5,297,662 | 3/1994 | Tsuyama et al. | 180/197 X |

FOREIGN PATENT DOCUMENTS 1-269621  10/1989  Japan .

Primary Examiner—Kevin Hurley
Attorney, Agent, or Firm—Lowe, Price, LeBlanc & Becker

[57]           ABSTRACT

An automobile traction control system in combination with a throttle control system of an internal combustion engine for controlling traction of drive wheels, comprises a sub-throttle for adjusting an engine-power by varying its opening amount and a controller responsive to a slip amount of the drive wheel for controlling the sub-throttle opening to reduce an engine-power irrespective of an accelerator pedal work when the slip amount exceeds a predetermined threshold. To effectively suppress undesired acceleration-slip for example when starting on a low-μ road, the controller performs a sub-throttle slow-opening control under a particular condition of at least a low vehicle speed, a low-μ road and a great depression of an accelerator. During the slow-opening control, the sub-throttle opening increases slowly, after once adjusting the sub-throttle opening essentially to zero irrespective of the slip amount of the drive wheel.

14 Claims, 10 Drawing Sheets

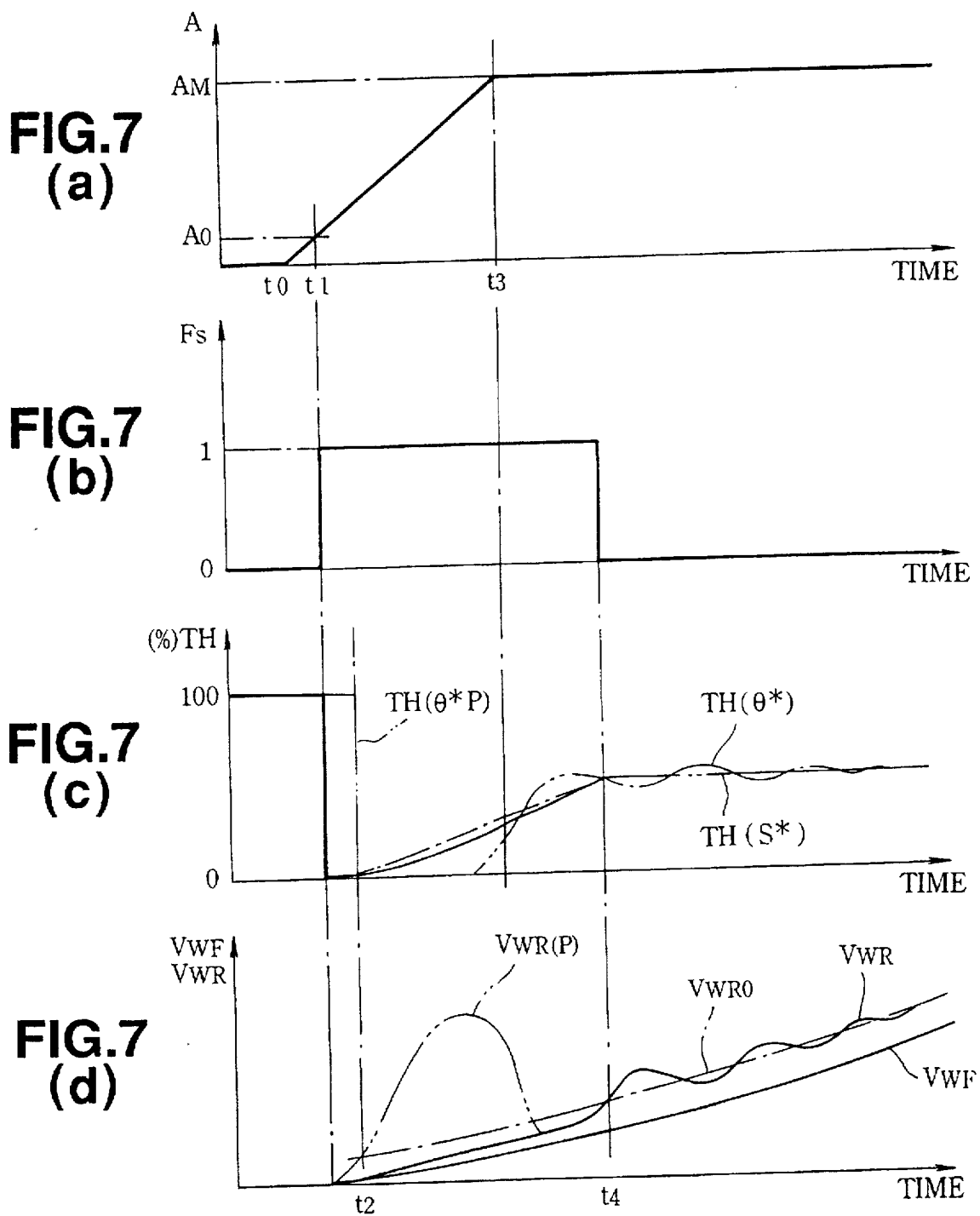

TRACTION CONTROL SYSTEM FOR AUTOMOTIVE VEHICLES

BACKGROUND OF THE INVENTION

1. Field of the Invention

The present invention relates to an automobile traction control system which prevents acceleration-slip at drive wheels, and specifically to a system which is capable of properly controlling a driving force or a driving torque applied to each drive wheel of an automobile by controlling a power produced by an internal combustion engine.

2. Description of the Prior Art

As is generally known, when a car is accelerated on a low-friction road often called a low-µ road, or when the car is accelerated on a high-friction road often called a high-µ road with excessive depression of the accelerator pedal, or in case that tires mounted on drive wheels have a comparatively poor tire characteristic and thus the tires roll on roads with less traction, providing insufficient frictional contact between the road surface and the tires associated with the drive wheels, there is a tendency for the drive wheels to slip. Under these conditions, the car could obtain neither a satisfactory acceleration-performance nor a high driveability. In order to avoid this and to improve both the acceleration performance and the driveability, there have been proposed and developed various traction control systems for automotive vehicles which can actively suppress and prevent drive-wheel spin or acceleration-slip by properly controlling a driving torque transmitted from a drive wheel to a road surface. Recently, various controlled mechanisms or systems and various control parameters are utilized for the traction control (the acceleration-slip suppression control). In one traditional type of traction control systems, an engine-power of an internal combustion engine is often controlled to ensure good traction at drive wheels. In such a type, a sub-throttle is generally provided in addition to a main throttle whose opening is controlled directly via a mechanical linkage such as an accelerator wire by way of a depressing action of an accelerator pedal, or controlled indirectly (electromagnetically) depending on the depressing action of the accelerator. On the other hand, the opening amount of the sub-throttle is variably controlled by means of an actuator for example an electric reversible motor, a stepping motor or the like, and additionally the sub-throttle is normally held at its full-open position. A slipping state (such as a slippage, a slip amount or a slip ratio) of the drive wheel is usually calculated as a function of a wheel speed of a non-driven wheel and a wheel speed of a drive wheel. As is generally known, the former wheel speed can be often regarded as a vehicle speed. In the event that the detected value of the slipping state of the drive wheel, e.g. the slip ratio of the drive wheel, exceeds a predetermined threshold of slippage, the sub-throttle is usually adjusted toward its closed position to temporarily reduce the engine-power output, thus suppressing acceleration-slip of the drive wheel. At this time, for the purpose of compensating a response-time delay of the engine-power output control to the opening-amount control of the sub-throttle, a so-called feed-forward control is firstly performed to ensure a rapid drop in the opening degree (the opening amount) of the sub-throttle to such a degree that the driving torque of the drive wheel almost matches a friction coefficient of the road surface on which the car is traveling actually, and then a so-called feed-back control is performed for a fine-adjustment of the opening amount of the sub-throttle. However, under a particular condition in which acceleration-slip tends to occur at drive wheels and additionally such a slipping state cannot be easily suppressed, for example when the car begins to run on a low-friction road or when quickly starting the car, there is such a problem that the slipping state cannot be effectively suppressed even when the sub-throttle is quickly closed by way of the feed-forward control just after the occurrence of excessive slippage at the drive wheels. This problem results from a response-time delay inherent in the internal combustion engine. That is, when the sub-throttle opening is adjusted rapidly toward the closed position in response to the occurrence of slippage at the drive wheels, the engine-power output itself cannot be quickly lowered. In order to avoid such a wheel-slip (acceleration-slip) in advance, a snow mode (or such a select-position that the car can start at a less gear ratio for example a second gear speed) will be often selected by the driver in case of an automobile with an automatic transmission. In an automobile with a manual transmission, a second gear speed is frequently selected for the purpose of starting at a less gear ratio. In the case that the car started at a less gear ratio, if once acceleration-slip has occurred at drive wheels, the slippage of the drive wheel would not be efficiently rapidly reduced to a suitable level. Particularly, in an automobile with an automatic transmission in which the engine power flows through a torque converter to drive wheels, when the car starts, there is a big difference in speeds between a driving member (usually called an impeller) and a driven member (usually called a turbine), and thus resulting in a comparatively great delay of engine-power transmission in the torque converter. In this case, a time, required for suppressing the slip ratio within an acceptable level, tends to be undesiredly multiplied, because the delay of torque transmission in the torque converter is further added to the previously-noted response-time delay inherent in the internal combustion engine. Additionally, owing to a torque-multiplication action of the torque converter, there is a tendency for the slippage occurring at the drive wheels to become greater.

SUMMARY OF THE INVENTION

Accordingly, it is an object of the invention to provide an improved traction control system for automotive vehicles which avoids the foregoing disadvantages of the prior art.

It is another object of the invention to provide an automobile traction control system which is capable of effectively suppressing undesirable acceleration-slip at drive wheels, when the vehicle begins to run on low-µ roads and/or when quick starting with an excessive driving torque.

It is a further object of the invention to provide an automobile traction control system in combination with a throttle control system of an internal combustion engine, for optimally controlling traction (a driving torque) of drive wheels with a high response by adjusting an opening amount of a sub-throttle, irrespective of depression of an accelerator pedal.

In order to accomplish the aforementioned and other objects of the invention, an automobile traction control system in combination with a throttle control system of an internal combustion engine for controlling traction of drive wheels, comprises means for detecting a slip amount of the drive wheel and for producing a slip-amount indicative signal value, control means responsive to the slip-amount indicative signal value for controlling an opening amount of a throttle of the engine to reduce an engine-power irrespective of an accelerator pedal work when the slip-amount indicative signal value exceeds a predetermined threshold, means for detecting a vehicle speed and for producing a vehicle-speed indicative signal value, means for detecting an opening amount of the accelerator and for producing an accelerator-opening-amount indicative signal value, and means for detecting a friction coefficient of a road surface and for producing a friction-coefficient indicative signal value, wherein the control means responsive to a particular condition in which the vehicle-speed indicative signal value is below a predetermined low speed, the accelerator-opening-amount indicative signal value is above a predetermined amount, and the friction-coefficient indicative signal value is below a predetermined low friction coefficient, for once adjusting the opening amount of the throttle to zero or to a small value nearly equal to zero irrespective of the slip-amount indicative signal value, in presence of the particular condition.

According to another aspect of the invention, an automobile traction control system in combination with a throttle control system of an internal combustion engine for controlling traction of drive wheels, comprises a sub-throttle disposed upstream of a main throttle linked to an accelerator pedal, for adjusting an engine-power by varying an opening amount of the sub-throttle, means for detecting a slip amount of the drive wheel and for producing a slip-amount indicative signal value, control means responsive to the slip-amount indicative signal value for controlling the opening amount of the sub-throttle to reduce an engine-power irrespective of an accelerator pedal work when the slip-amount indicative signal value exceeds a predetermined threshold, means for detecting a vehicle speed and for producing a vehicle-speed indicative signal value, means for detecting an opening amount of the accelerator and for producing an accelerator-opening-amount indicative signal value, and means for detecting a friction coefficient of a road surface and for producing a friction-coefficient indicative signal value, wherein the control means responsive to a particular condition in which the vehicle-speed indicative signal value is below a predetermined low speed, the accelerator-opening-amount indicative signal value is above a predetermined amount, and the friction-coefficient indicative signal value is below a predetermined low friction coefficient, for increasing the opening amount of the sub-throttle slowly, after once adjusting the opening amount of the sub-throttle to zero or to a small value nearly equal to zero irrespective of the slip-amount indicative signal value, in presence of the particular condition.

The control means slowly increases the opening amount of the sub-throttle at a throttle-opening velocity based on the friction-coefficient indicative signal value and the accelerator-opening-amount indicative signal value, after once adjusting the opening amount of the sub-throttle to zero or to a small value nearly equal to zero in presence of the particular condition. The throttle-opening velocity is calculated by multiplying the accelerator-opening-amount indicative signal value by a friction-coefficient dependent proportional gain, and the friction-coefficient dependent proportional gain is set at a smaller value when the friction-coefficient indicative signal value is below the predetermined low friction coefficient. Alternatively, the control means may increase the opening amount of the sub-throttle slowly at a throttle-opening velocity based on a variation of the accelerator-opening-amount indicative signal value, after once adjusting the opening amount of the sub-throttle to zero or to a small value nearly equal to zero in presence of the particular condition. In this case, the throttle-opening velocity is fixed to a predetermined upper limit when the variation is above a predetermined threshold. The throttle-opening velocity is proportional to the variation when the variation is below the predetermined threshold.

According to a further aspect of the invention, an automobile traction control system in combination with a throttle control system of an internal combustion engine for controlling traction of drive wheels, comprises a sub-throttle disposed upstream of a main throttle linked to an accelerator pedal, for adjusting an engine-power by varying an opening amount of the sub-throttle, means for detecting a slip amount of the drive wheel and for producing a slip-amount indicative signal value, control means responsive to the slip-amount indicative signal value for controlling the opening amount of the sub-throttle to reduce an engine-power irrespective of an accelerator pedal work when the slip-amount indicative signal value exceeds a predetermined threshold, means for detecting a vehicle speed and for producing a vehicle-speed indicative signal value, means for detecting an opening amount of the accelerator and for producing an accelerator-opening-amount indicative signal value, means for detecting an actual opening amount of the sub-throttle and for producing a throttle-opening-amount indicative signal value, and means for detecting a friction coefficient of a road surface and for producing a friction-coefficient indicative signal value, wherein the control means responsive to a particular condition in which the vehicle-speed indicative signal value is below a predetermined low speed, the accelerator-opening-amount indicative signal value is above a predetermined amount, and the friction-coefficient indicative signal value is below a predetermined low friction coefficient, for slowly increasing the opening amount of the sub-throttle at a first throttle-opening velocity based on a deviation between the accelerator-opening-amount indicative signal value and the throttle-opening-amount indicative signal value or at a second throttle-opening velocity based on only the accelerator-opening-amount indicative signal value, after once adjusting the opening amount of the sub-throttle to zero or to a small value nearly equal to zero irrespective of the slip-amount indicative signal value, in presence of the particular condition. Under the particular condition, it is preferable that the sub-throttle is slowly opened at a lower speed of the first and second throttle-opening velocities. The friction-coefficient indicative signal value is derived as a function of the slip-amount indicative signal value and a longitudinal acceleration exerted on a vehicle.

According to a still further aspect of the invention, an automobile traction control system in combination with a throttle control system of an internal combustion engine for controlling traction of drive wheels, comprises a sub-throttle disposed upstream of a main throttle linked to an accelerator pedal, for adjusting an engine-power by varying an opening amount of the sub-throttle, means for detecting a slip amount of the drive wheel and for producing a slip-amount indicative signal value, means for detecting a vehicle speed and for producing a vehicle-speed indicative signal value, means for detecting an opening amount of the accelerator and for producing an accelerator-opening-amount indicative signal value, means for detecting a friction coefficient of a road surface and for producing a friction-coefficient indicative signal value, control means for controlling the opening amount of the sub-throttle at a first mode in which the opening amount of the sub-throttle is increased slowly at a restricted throttle-opening velocity from zero or from a small value nearly equal to zero irrespective of the slip-amount indicative signal value, under a particular condition in which the vehicle-speed indicative signal value is below a predetermined low speed, the accelerator-opening-amount indicative signal value is above a predetermined amount, and the friction-coefficient indicative signal value is below a predetermined low friction coefficient, and the control means controlling the opening amount of the sub-throttle at a second mode except the particular condition in which mode the opening amount of the sub-throttle is controlled to reduce the slip-amount indicative signal value toward a target slip amount when the slip-amount indicative signal value exceeds a predetermined threshold.

BRIEF DESCRIPTION OF THE DRAWINGS

FIGS. 7(a), 7(b), 7(c) and 7(d) are time charts, explaining the operation of the driving-torque control executed according to the flow chart shown in FIG. 5.

DESCRIPTION OF THE PREFERRED EMBODIMENTS

First Embodiment

Figure 1:
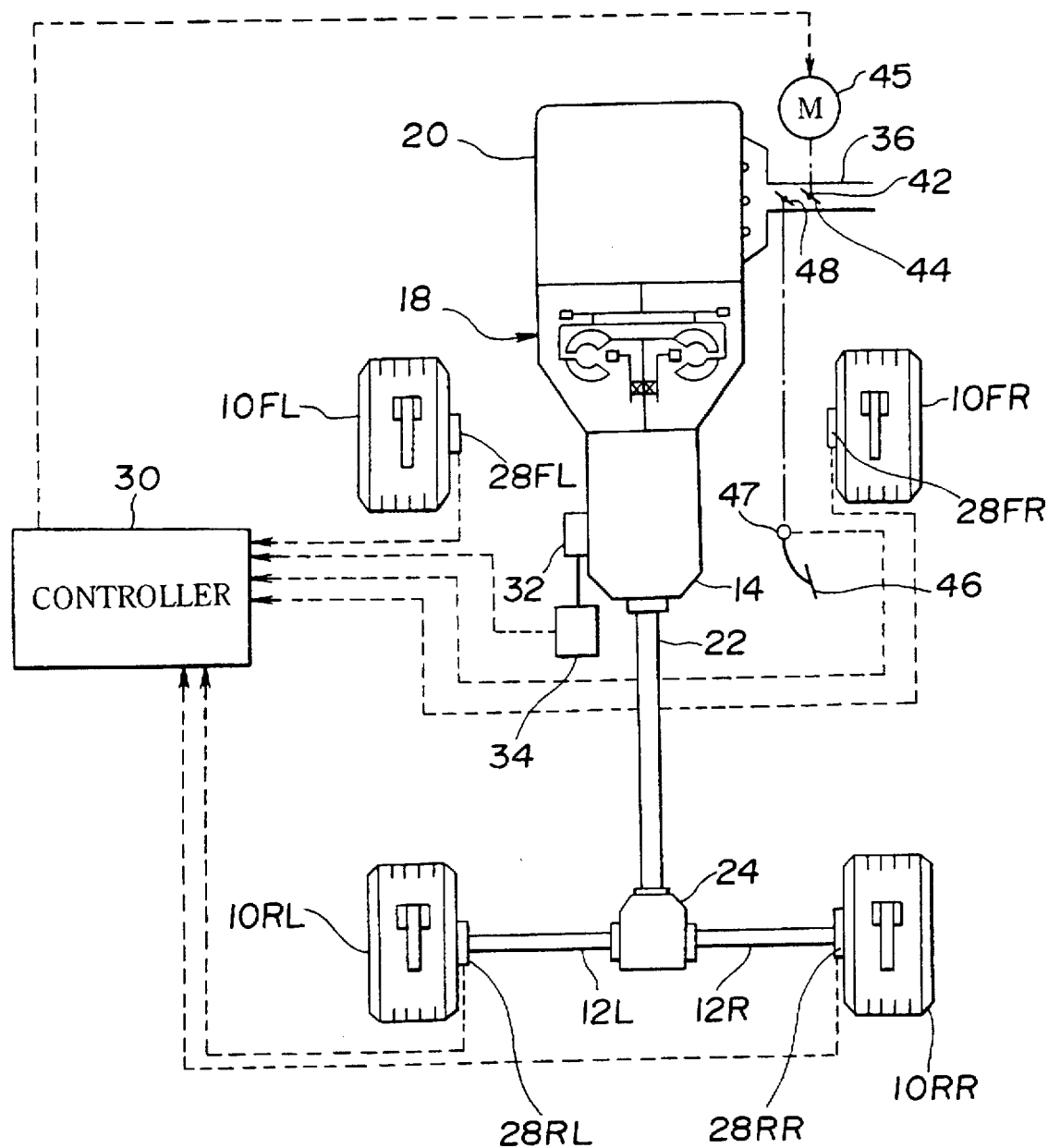
FIG. 1 is a schematic system diagram illustrating an automotive vehicle equipped with a controller applied to a traction control system according to the present invention.

Referring now to the drawings, particularly to FIG. 1, the traction control system of the invention is exemplified in case of a rear-wheel drive vehicle with an automatic transmission in which the engine-power output is delivered only to rear road wheels. As seen in FIG. 1, the power output generated from an internal combustion engine 20 is transmitted through a torque converter 18 to an automatic transmission 14 in which a driving torque is suitably adjusted according to a gear position automatically selected. The adjusted driving torque is further transmitted through a propeller shaft 22 and then distributed through a differential 24 to left and right axles 12L and 12R. The driving torques delivered to the left and right axles 12L and 12R are further transmitted through the rear-left drive wheel 10RL and the rear-right drive wheel 10RR to the road surface. Reference numerals 10FL and 10FR denote a front-left non-driven wheel and a front-right non-driven wheel, respectively. Provided in an air-intake system including an intake manifold 36, are a main throttle 48 whose opening amount is adjustable between its normally-closed position and its full-open position, depending on an amount of depression of the accelerator pedal 46 (i.e., the opening amount of the accelerator), and a sub-throttle 44 whose opening amount is adjustable between its normally-open position and its closed position, depending on an angular displacement of an output shaft of an actuator such as a stepping motor 45. In the shown embodiment, the stepping motor 45 is connected to the sub-throttle 44, such that the opening degree (the amount of the sub-throttle opening) of the sub-throttle is adjusted from the sub-throttle normally-open position to the sub-throttle closed position, depending upon angular steps controlled electromagnetically. Actually, for the purpose of reduction of the engine power, the opening amount of the sub-throttle 44 is adjusted to a less value than that of the main throttle 48. The sub-throttle 44 is equipped with a throttle opening-amount sensor 42 for detecting an opening amount of the sub-throttle 44 and for generating a throttle-opening-amount indicative signal TH. As detailed later, the opening amount of the sub-throttle 44 can be adjusted by changing the angular step (angular movement) of the stepping motor 45, based on a drive signal generated by a controller 30. Fundamentally, the number of angular steps of the stepper motor 45 is adjusted through the feed-back control, on the basis of a value of the signal TH. Ordinarily, the main throttle 48 is mechanically linked to the accelerator pedal 46 so that the opening amount of the main throttle 48 is dependent on the amount of depression of the accelerator pedal, that is, the opening amount of the accelerator. Alternatively, an additional actuator such as a rotary solenoid may be provided so that the main throttle 48 can be rotated indirectly by the additional actuator. An accelerator-depression sensor 47 is provided to detect the amount of depression of the accelerator pedal 46 (the opening amount of the accelerator), and also to generate an accelerator-opening-amount indicative signal A. The accelerator-opening-amount indicative signal A is output into an engine controller (not shown), and then the engine controller electrically drives the additional actuator such that the opening amount of the main throttle 48 is adjusted to a target value. The accelerator-opening-amount indicative signal A is also output into the controller 30. The torque converter 18 itself is essentially equal to a conventional well-known torque converter. Also, the automatic transmission 14 itself is essentially equivalent to a conventional well-known automatic transmission. An actuator unit 32 is traditionally connected to the transmission 14. The actuator unit 32 is driven in response to a control signal from an automatic-transmission control unit 34, and whereby a gear ratio of the transmission 14 can be controlled so that a proper reduction ratio is achieved generally in response to a vehicle speed and an amount of the throttle opening, both serving as variables, and an engine revolution speed. In the embodiment, it is assumed that the automatic transmission 14 has three forward-driving ranges, namely a drive range (D position), a first range (1st. position), and a second range (2nd. position), in addition to a parking range (P position), a reverse range (R position) and a neutral range (N position). The transmission 14 is generally designed so that engine brake can be provided at the first and second ranges. Ordinarily, the shift position is selected by manually selecting a select-lever position (shift lever position). Although it is not clearly shown, actually, there is information-interchange between the automatic-transmission control unit 34 and the engine controller (not shown), for the purpose of ensuring an optimization control for both the engine 20 and the automatic transmission 14, during usual driving of the vehicle. As input information, a signal Ne indicative of an engine revolution speed of the engine 20, a signal i indicative of a change-gear ratio (a current transmission gear ratio) and a signal M indicative of a shift-lever position currently selected are output from the automatic-transmission control unit 34 to the controller 30 explained later. As seen in FIG. 1, wheel-speed sensors 28FL, 28FR, 28RL and 28RR are provided at the respective road wheels 10FL, 10FR, 10RL and 10RR. Each wheel-speed sensor outputs a wheel-speed indicative signal Vwj (j=FL, FR, RL, RR) representative of a rotational speed of the associated road wheel in the form of a pulse signal.

Figure 2:
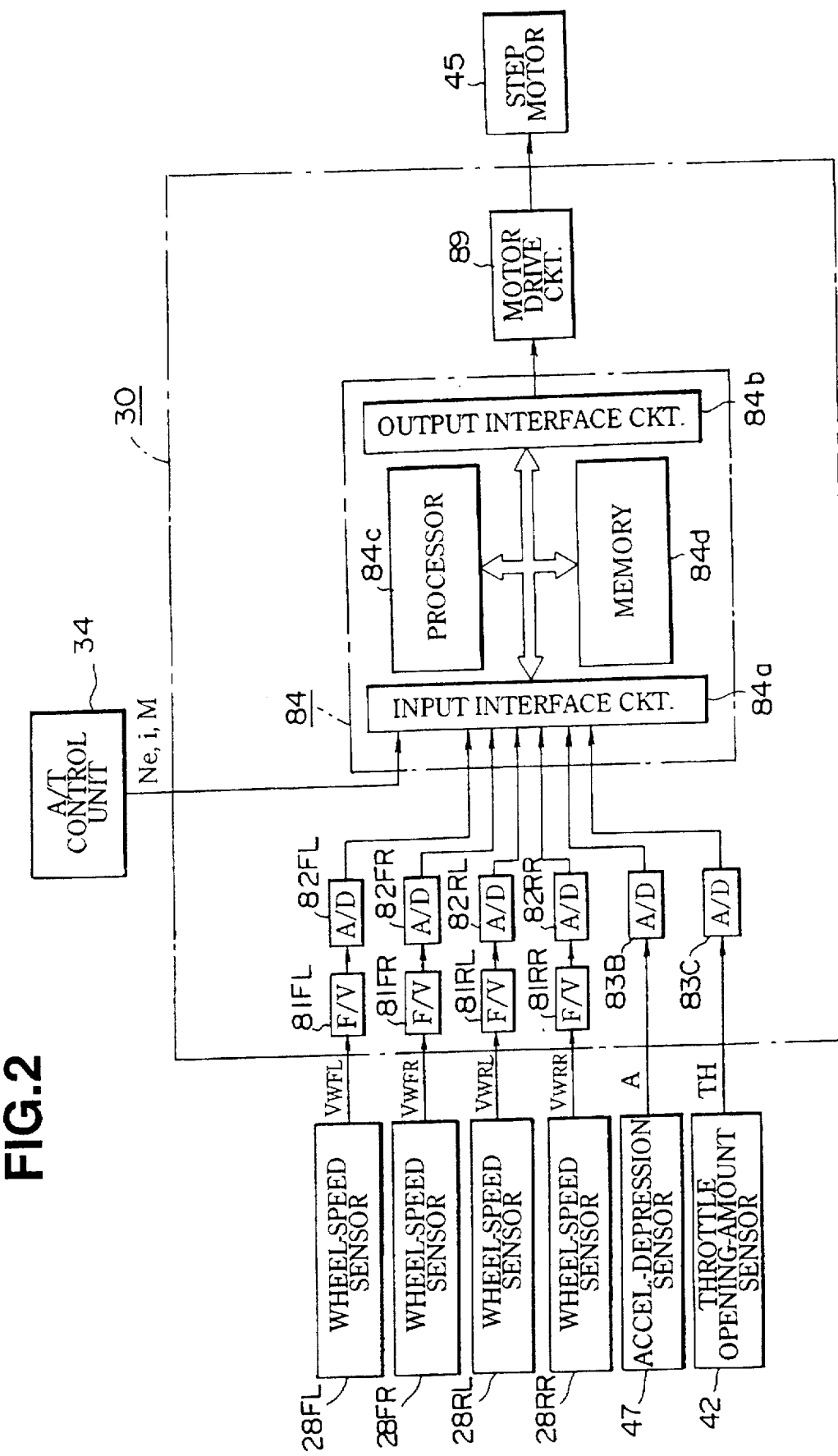
FIG. 2 is a block diagram illustrating one example of the controller of the traction control system shown in FIG. 1.

As shown in FIG. 2, the controller 30 receives the front-left wheel-speed indicative signal VwFL, the front-right wheel-speed indicative signal VwFR, the rear-left wheel-speed indicative signal VwRL, and the rear-right wheel-speed indicative signal VwRR from the wheel-speed sensors 28FL to 28RR. The controller 30 includes four frequency-to-voltage converters (F/V converters) 81FL, 81FR, 81RL and 81RR, four analog-to-digital converters (A/D converters) 82FL, 82FR, 82RL and 82RR, two additional A/D converters 83B and 83C, a microcomputer 84, and a motor drive circuit 89. The F/V converters 81FL to 81RR are provided to convert the four pulse signals VwFL, VwFR, VwRL and VwRR into voltage signals (analog signals). The A/D converters 82FL to 82RR are provided to convert the voltage signals from the F/V converters 81FL to 81RR into digital signals. The A/D converters 83B and 83C are provided to convert the accelerator-opening-amount indicative signal A from the accelerator-depression sensor 47 and the throttle-opening-amount indicative signal TH from the throttle opening-amount sensor 42 into digital signals. The microcomputer 84 includes an input interface circuit 84a, an output interface circuit 84b, a processor 84c, and a memory 84d. The input interface circuit 84a receives the digital signals from the six A/D converters 82FL, 82FR, 82RL, 82RR, 83B and 83C and the three signals from the automatic-transmission control unit 34, namely the engine-speed indicative signal Ne, the change-gear ratio indicative signal i and the shift-lever position indicative signal M. The output interface circuit 84b outputs a drive signal to a motor drive circuit 89, for changing the angular step of the stepping motor 45 and thus adjusting the opening amount of the sub-throttle 44. The processor 84c functions to derive a value of the drive signal to be output from the output interface circuit 84b on the basis of the plural signals Vwj (j=FL to RR), A, TH, Ne, i and M, all input into the input interface circuit 84a. The memory 84d memorizes a program necessary for a predetermined arithmetic processing executed in the processor 84c and also memorizes processing results of the processor 84c.

Figure 3:
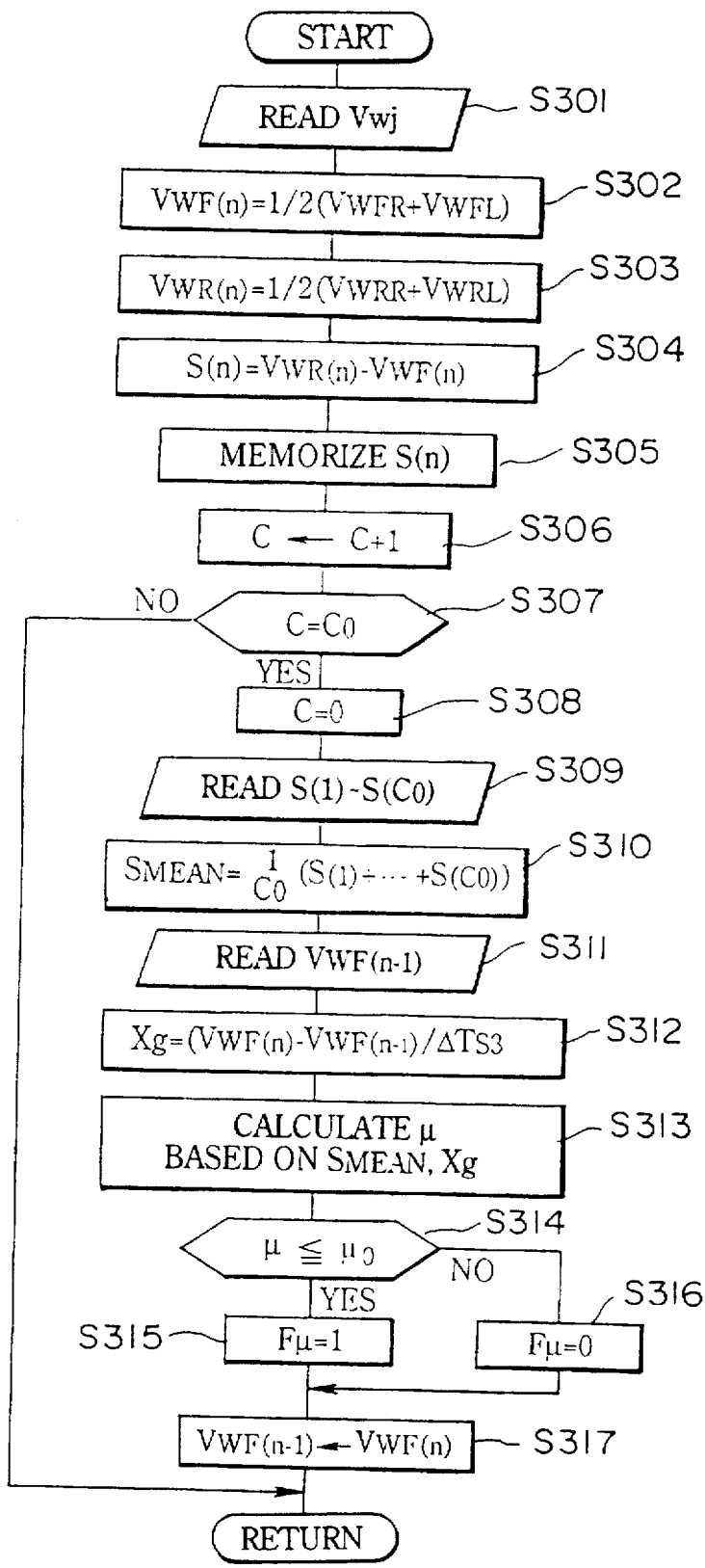
FIG. 3 is a flow chart illustrating an arithmetic processing necessary to set a road-surface friction-coefficient indicative flag Fµ related to a friction coefficient µ of a road surface on which the car is traveling actually.
Figure 4:
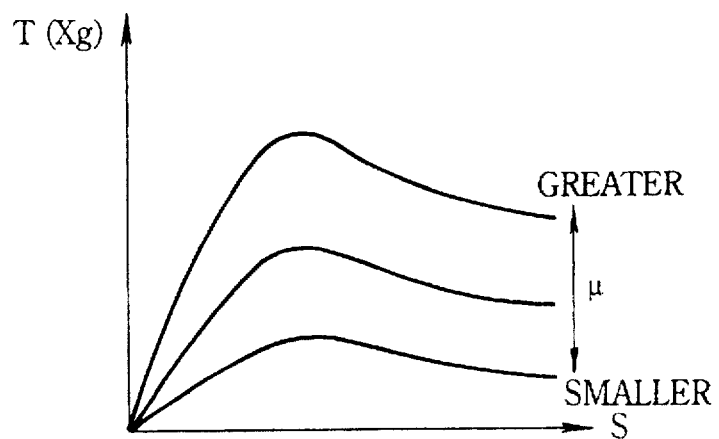
FIG. 4 is a graph illustrating the relationship between a slippage or a slip amount S at drive wheels and a driving torque T (essentially equivalent to a longitudinal acceleration Xg), depending on a friction coefficient µ of the road surface.

Referring to FIG. 3, there is shown an arithmetic processing for deciding a road surface condition based on a friction coefficient μ detected. The processing routine shown in FIG. 3 is executed by the processor 84c as time-triggered interrupt routines to be triggered every predetermined sampling time intervals ΔTs3, such as 10 msec. The time interval ΔTs3, is set to be less than a sampling time interval ΔTs$_2$ for an arithmetic processing shown in FIG. 5. A counter is also provided in the processor, for counting the number of sampling. Generally, the sampling number or the counted value C of the counter is reset to zero, when the ignition switch is turned ON. On the other hand, FIG. 4 shows the mutual relation between a slippage (a slip ratio or a slip amount S) and a driving torque T essentially equivalent to a longitudinal acceleration Xg, depending on a friction coefficient μ of the road surface. That is, the friction coefficient μ serves as a parameter of the driving torque T derived as a function of the slip amount S. In other words, the friction coefficient μ can be derived as a function of the driving torque T (the longitudinal acceleration Xg) and the slip amount S. As is generally known, changes in the longitudinal acceleration Xg exerted on the vehicle will result from occurrence of acceleration-slip at the drive wheels, and as a result the wheel-speed at the respective drive wheel will also vary. In this case, there is a time lag between a timing of the occurrence of acceleration-slip and a timing of the change in the wheel-speed owing to the acceleration-slip. In consideration of such a time lag, the slip amounts S(n) are calculated every sampling time intervals ΔTs3, for a period of time from before a predetermined time period t corresponding to the above-noted time lag to the current time. In the shown embodiment, the friction coefficient μ of the road surface can be derived from a mean value SMEAN of the slip amounts S(n) sampled and the current longitudinal acceleration Xg, on the basis of the correlation shown in FIG. 4.

The arithmetic processing for a road surface condition (as to whether or not a friction coefficient μ of the road surface is below a predetermined low friction coefficient μ0) is actually achieved in accordance with the flow chart shown in FIG. 3.

In step S301, the wheel-speed indicative signals Vwj (j=FL, FR, RL and RR) from the respective wheel-speed sensors 28FL to 28RR are read in.

In step S302, a mean front-wheel speed VwF (a mean non-driven-wheel speed) is derived from the following expression (6).

$$V_{wF}=(V_{wFL}+V_{wFR})/2 \qquad (6)$$

where the mean front-wheel speed VwF is derived as a simple mean value of the front-left wheel-speed indicative signal value VwFL of the front-left wheel 10FL and the front-right wheel-speed indicative signal value VwFR of the front-right wheel 10FR. The mean front-wheel speed VwF is regarded as a vehicle speed.

In step S303, a mean rear-wheel speed VwR (a mean drive-wheel speed) is derived from the following expression (5).

$$V_{wR}=(V_{wRL}+V_{wRR})/2 \qquad (5)$$

where the mean rear-wheel speed VwR is derived as a simple mean value of the rear-left wheel-speed indicative signal value VwRL of the rear-left wheel 10RL and the rear-right wheel-speed indicative signal value VwRR of the rear-right wheel 10RR. During acceleration-slip, the mean rear-wheel speed VwR will become greater than the mean front-wheel speed VwF (regarded as the vehicle speed).

In step S304, a mean slip speed of the rear wheels 10RL and 10RR is calculated as a deviation between the mean rear-wheel speed VwR and the mean front-wheel speed VwF, from the following expression (7). The slip speed is regarded as a current slip amount S(n) of the drive wheels.

$$S(n)=V_{wR}-V_{wF} \qquad (7)$$

In step S305, the current slip amount S(n) of the drive wheels is memorized in a predetermined memory address of the memory 84d.

In step S306, the counted value C of the counter is counted up by "1".

In step S307, a test is made to determine whether or not the counted value C reaches a predetermined value Co which is determined in consideration of the time lag between the occurrence of acceleration-slip and the change in the mean rear-wheel speed VwR. When the answer to step S307 is affirmative (YES), i.e., when the counted value C has reached the predetermined value Co, step S308 proceeds. Conversely, when the answer to step S307 is negative (NO), i.e., when the counted value C is still below the predetermined value Co, a main program is recovered via step S307. The above-noted predetermined counted value Co is represented by an equation (t=Co×ΔTs3), where t denotes the predetermined time period corresponding to the previously-noted time lag, and ΔTs3 denotes the sampling time interval for the slip amount S(n).

In step S308, the counted value C is reset to "0".

In step S309, the slip amount data S(1) to S(n), which are derived in step S304 every sampling time intervals ΔTs3 and memorized in the memory 84d in step S305, are read. Actually, the slip amount data from S(1) to S(Co) are read, since the sampling number n corresponds to the predetermined counted value Co.

In step S310, the mean value S$_{MEAN}$ of the slip amounts of S(1) to S(Co) is calculated in accordance with the following expression (16).

$$S_{MEAN}=(S(1)+S(2)+\ldots +S(n))/n+tm \quad (16)$$

Based on the sampling number n corresponding to the predetermined counted value Co, the mean slip amount S$_{MEAN}$ of the rear drive-wheels is represented by the equation {S$_{MEAN}$=(S(1)...+S(Co))/Co} in step S310 of the flow chart shown in FIG. 3.

In step S311, read is the previous value VwF(n−1) of the mean front-wheel speed, which is obtained through the previous arithmetic processing executed prior to the current arithmetic processing.

In step S312, the current longitudinal acceleration Xg is calculated as a function of the current value VwF(n) of the mean front-wheel speed and the previous value VwF(n−1) of the mean front-wheel speed from the following expression (17).

$$Xg=\{V_{wF}(n)-V_{wF}(n-1)\}/\Delta T_{s3} \quad (17)$$

In step S313, the friction coefficient μ of the road surface is calculated as a function of the mean slip amount S$_{MEAN}$ of the drive wheels and the longitudinal acceleration Xg, utilizing the slip-amount S$_{MEAN}$ (generally representative of S) versus longitudinal-acceleration Xg characteristic curve shown in the graph of FIG. 4. The characteristic of FIG. 4 is conventionally memorized in the memory 84d in the form of a data map.

In step S314, a test is made to determine whether the friction coefficient μ calculated in step S313 is equal to or less than a predetermined friction coefficient μo. When the answer to step S314 is affirmative (YES), step S315 proceeds in which a control flag Fμ is set to "1", and then step S317 enters. In contrast, when the answer to step S314 is negative (NO), step S316 proceeds in which the control flag Fμ is set to "0", and then step S317 enters. The above-noted control flag Fμ will be hereinafter referred to as a "road-surface friction-coefficient indicative flag", since the control flag Fμ is dependent upon the friction coefficient μ of the road surface on which the vehicle is traveling actually.

In step S317, the previous mean front-wheel speed VwF (n−1) is updated by the current mean front-wheel speed VwF(n), and then the updated mean front-wheel speed is memorized in the memory 84d. Thereafter, the routine returns to the main program.

In this manner, the processing from step S301 to step S306 is repeatedly executed until the counted value C reaches the predetermined value Co, that is the predetermined time period t has elapsed. As soon as the counted value C reaches the predetermined value Co, by way of the processing from step S307 to step S313, the counted value C is firstly reset to "0", the mean slip amount S$_{MEAN}$ of the drive wheels is calculated according to the expression (16), the current longitudinal acceleration Xg exerted on the vehicle is calculated according to the expression (17), and then the friction coefficient μ is calculated on the basis of the mean slip amount S$_{MEAN}$ and the longitudinal acceleration Xg, utilizing the characteristic curve of FIG. 4. Thereafter, through steps S314, S315 and S316, the control flag Fμ is selectively set to "1" or "0", depending on the friction coefficient μ calculated. As set forth above, the friction coefficient μ is derived from the mean value S$_{MEAN}$ of the slip amounts sampled for the predetermined period t correlated to the previously-described time lag, but not from only the current slip amount S(n). On the other hand, the current longitudinal acceleration Xg is used as the longitudinal acceleration data. Therefore, it will be appreciated that the friction coefficient μ calculated in accordance with the above-explained processing of FIG. 3, is appropriate to the actual road surface condition, that the calculated friction coefficient μ is essentially equivalent to the actual friction coefficient of the road surface.

Figure 5:
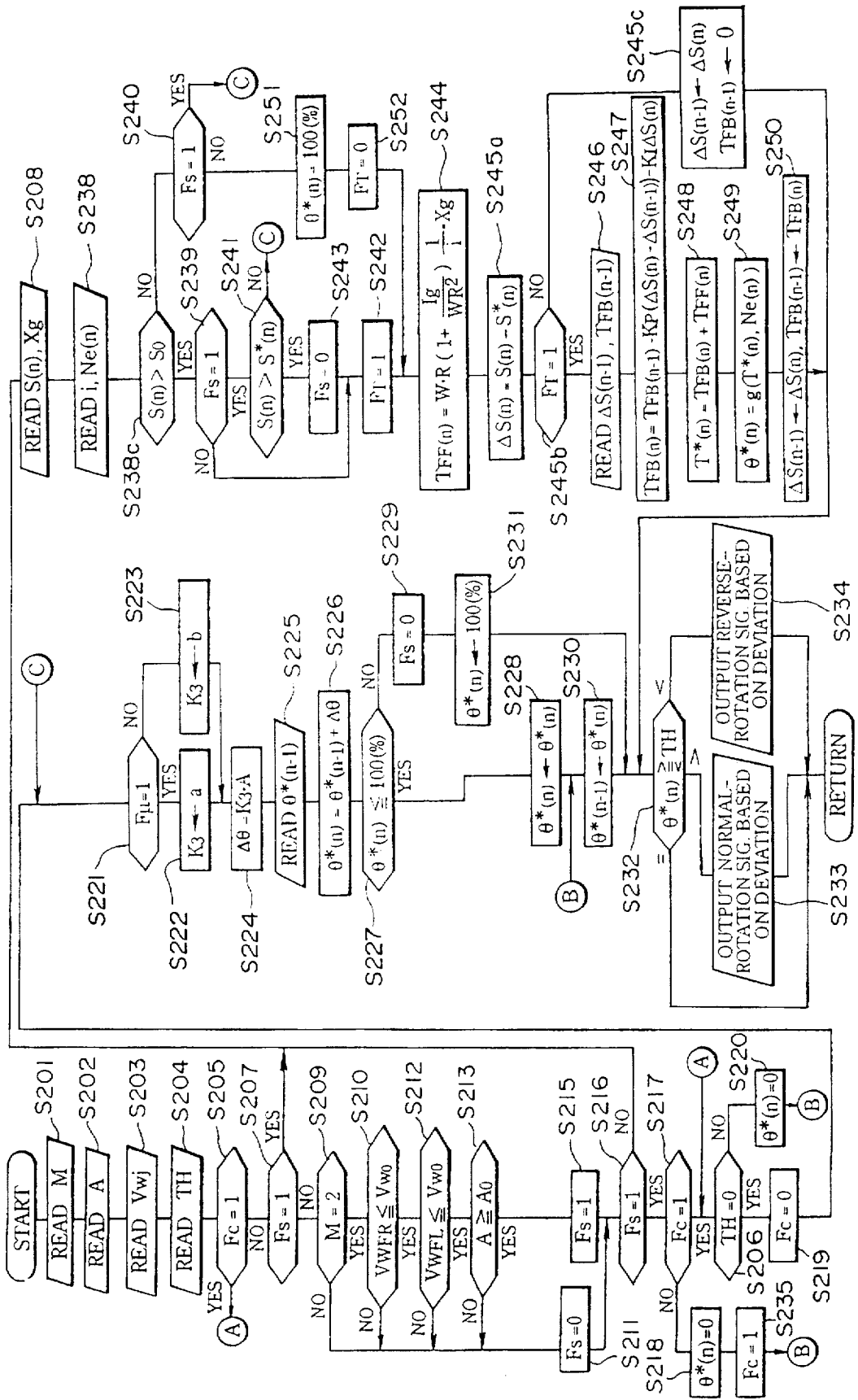
FIG. 5 is a flow chart illustrating an arithmetic processing for a driving-torque control (a sub-throttle opening control) executed by a first embodiment of the traction control system.

In the first embodiment of the traction control system made according to the invention, the arithmetic processing for the throttle-opening-amount control for the sub-throttle 44 is executed by the microcomputer 84, in accordance with the flow chart illustrated in FIG. 5. Note that the road-surface friction-coefficient indicative flag Fμ determined through the processing of FIG. 3 is read from the memory 84d, and applied to a control flag Fμ for the processing shown in FIG. 5. The arithmetic processing of FIG. 5 is also executed by the processor 84c as time-triggered interrupt routines to be triggered every predetermined intervals ΔTs$_2$, such as 20 msec.

In step S201, read is the shift-lever position indicative signal M from the automatic-transmission control unit 34.

In step S202, read is the accelerator-opening-amount indicative signal A from the accelerator-depression sensor 47.

In step S203, read are the wheel-speed indicative signals Vwj (j=FL to RR) from the wheel-speed sensors 28FL to 28RR.

In step S204, read is the throttle-opening-amount indicative signal TH from the throttle opening-amount sensor 42.

In step S205, a test is made to determine whether or not a control flag Fc is set at "1". The state of Fc=1 means that the throttle-opening-amount is set to a minimum value (zero) so that the sub-throttle 44 is held at its closed position. Therefore, the control flag Fc will be hereinafter referred to as a "throttle closed-state indicative flag". When the answer to step S205 is affirmative (YES), i.e., in case of Fc=1, step S206 proceeds. When the answer to step S205 is negative (NO), i.e., in case of Fc=0, step S207 proceeds.

In step S207, a test is made to determine whether or not a control flag Fs is "1". The state of Fs=1 means that a slow opening control of the sub-throttle is executed. The control flag Fs will be hereinafter referred to as a "slow-opening-control state indicative flag". When the answer to step S207 is affirmative (YES), i.e., in case of Fs=1, step S208 proceeds. Conversely, when the answer to step S207 is negative (NO), i.e., in case of Fs=0, step S209 enters.

In step S209, a test is made to determine whether or not the shift-lever position indicative signal M (See step S201) is "2" indicative of a second range. In case of M=2, step S210 proceeds. In case that the signal M is not identical to 2, step S211 proceeds.

In step S210, a test is made to determine whether the front-right wheel-speed indicative signal VwFR of the four wheel-speed indicative signals Vwj read in through step S203 is equal to or less than a predetermined low speed Vwo for example 5km/h. When the answer to step S210 is affirmative (YES), i.e., in case of VwFR<Vwo, step S212 proceeds. When the answer to step S210 is negative (NO), i.e., in case of VwFR>Vwo, step S211 proceeds.

In step S212, a test is made to determine whether the front-left wheel-speed indicative signal VwFL is equal to or less than the predetermined speed Vwo. When the answer to step S212 is affirmative, i.e., in case of VwFL≦Vwo, step S213 proceeds. When the answer to step S212 is negative, i.e., in case of VwFL>Vwo, step S211 proceeds.

In step S213, a test is made to determine whether or not the accelerator-opening-amount indicative signal A is equal to or greater than a predetermined value $A_0$. When the answer to step S213 is affirmative, i.e., in case of $A \geq A_0$, step S215 proceeds. In contrast, when the answer to step S213 is negative, i.e., in case of $A<A_0$, step S211 proceeds.

In step S215, the slow-opening-control indicative flag Fs is set at "1". Then, in this sub-routine, the procedure flows to step S216.

In step S211, the slow-opening-control indicative flag Fs is reset at "0", and thereafter step S216 proceeds.

In step S216, a test is made to determine whether or not the slow-opening-control indicative flag Fs is "1". In case of Fs=1, step S217 proceeds. Conversely, in case of Fs=0, step S208 proceeds.

In step S217, a test is made to determine whether or not the throttle closed-state indicative flag Fc is "1". In case of Fc=1, step S206 proceeds. In case of Fc=0, step S218 proceeds.

In step S206, a test is made to determine whether or not the throttle-opening-amount indicative signal TH read at step S204 is zero. In case of TH=0, step S219 proceeds. In case of TH≠0, step S220 proceeds.

In step S219 the throttle closed-state indicative flag Fc is reset to "0", and thereafter step S221 enters in which a test is made to determine whether or not the road-surface friction-coefficient indicative flag Fμ is "1". When the answer to step S221 is affirmative (YES), i.e., in case of Fμ=1, step S222 proceeds. When the answer to step S221 is negative (NO), i.e., in case of Fμ=0, step S223 proceeds.

In step S222, a friction-coefficient dependent proportional gain or a proportional constant $K_3$ is set at a predetermined small value a, and then step S224 enters.

In step S223, the proportional constant $K_3$ is set at a predetermined value b (0<a<b) greater than the predetermined value a, and then step S224 proceeds.

In step S224, a throttle-opening velocity Δθ is calculated from the following expression (14), on the basis of the proportional constant $K_3$ obtained through step S221 via either step S222 or S223.

$$\Delta\theta = K_3 \times A \qquad (14)$$

where A denotes the accelerator-opening-amount indicative signal value.

Figure 6:
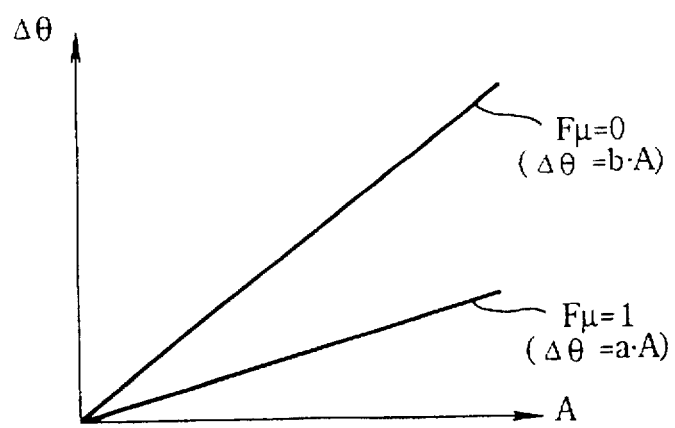
FIG. 6 is a graph illustrating the relationship between an accelerator-opening-amount indicative signal value A and an opening velocity Δθ of the sub-throttle which velocity is correlated to the control flag Fµ.

As appreciated from the graph illustrated in FIG. 6, by way of steps S221, S222, S223 and S224, the throttle-opening velocity Δθ of the sub-throttle 44 is determined on the basis of the accelerator-opening-amount indicative signal value A, depending on whether the road-surface friction-coefficient indicative flag Fμ is "1" or "0". The throttle-opening velocity Δθ corresponds to a rate-of-change or a variation in throttle-opening-amount indicative signal values TH which are read at step S204 every sampling time intervals $\Delta T_{s_2}$. Usually, the characteristics shown in FIG. 6 are stored in the memory 84d in the form of data map.

In step S225, read is the previous value θ*(n−1) of a target sub-throttle opening amount memorized in the memory 84d and obtained through the previous sampling executed before one cycle of the current sampling.

Thereafter, step S226 proceeds a current value θ*(n) of the target sub-throttle opening amount is calculated on the basis of the previous target sub-throttle opening amount θ*(n−1) read at step S225 and the throttle-opening velocity Δθ calculated through step S224, in accordance with the following expression (15).

$$\theta^*(n) = \theta^*(n-1) + \Delta\theta \qquad (15)$$

Subsequently to step S226, step S227 enters in which a test is made to determine whether or not the current target sub-throttle opening amount θ*(n) is equal to or less than 100(%). Step S228 proceeds in case of θ*(n)<100(%), while step S229 proceeds in case of θ*(n)>100(%).

In step S228, the current target sub-throttle opening amount data stored in the memory 84d is updated by the current target sub-throttle opening amount θ*(n) calculated at step S226. Then, the control procedure flows to step S230 in which the previous target sub-throttle opening amount data θ*(n−1) is updated with the current target sub-throttle opening amount data θ*(n) updated in step S228. The updated previous sub-throttle opening amount θ*(n−1) is memorized in memory 84d, and then step S232 enters.

In step S229 the slow-opening-control state indicative flag Fs is reset to "0", and then step S231 proceeds.

In step S231 the current target sub-throttle opening amount data θ*(n) is set at 100(%), and then step S232 proceeds.

In step S232, the current target sub-throttle opening amount data θ*(n) is compared with the throttle-opening-amount indicative signal value TH of the sub-throttle 44. In case of θ*(n)=TH, the main program is recovered from the sub-routine shown in FIG. 5. In case of θ*(n)>TH, step S233 enters. In case of θ*(n)<TH, step S234 enters.

In step S233, for the purpose of increasingly adjusting the opening amount of the sub-throttle 44 up to the current target sub-throttle opening amount θ*(n), a value of the drive signal to be output from the output interface circuit 84b is determined so that the drive signal is equivalent to a normal-rotation signal based on the deviation between the throttle-opening-amount indicative signal value TH read at step S204 and the current value θ*(n) of the target sub-throttle opening amount which amount is set at the previously-noted steps S218, S228, or S231, or steps S220, S249 or S251, as explained later. The drive signal normal-rotation signal) is then output to the stepping motor 45, with the result that the motor 45 is rotated in the direction of normal-rotation (positive rotation), and thus the angular step of the motor is properly increased in response to the previously-noted deviation. Thereafter, the main program is recovered.

In step S234, for the purpose of decreasingly adjusting the opening amount of the sub-throttle 44 down to the current target sub-throttle opening amount θ*(n), a value of the drive signal to be output from the output interface circuit 84b is determined so that the drive signal is equivalent to a reverse-rotation signal based on the deviation between the throttle-opening-amount indicative signal value TH and the current value θ*(n) of the target sub-throttle opening amount which amount is set at the previously-noted steps S228 or S231, or steps S249 or S251, as explained later. The drive signal (the reverse-rotation signal) is then output to the stepping motor 45, with the result that the motor is rotated in the direction of reverse-rotation (negative rotation), and thus the angular step of the motor is properly decreased in response to the deviation. Thereafter, the main program is recovered.

In step S218 the current value θ*(n) of the target sub-throttle opening amount is set at "0", and then step S235 proceeds in which the throttle closed-state indicative flag Fc is set at "1". Thereafter, the procedure flows from step S235 to step S230.

In step S220 the current value θ*(n) of the target sub-throttle opening amount is set at "0", and then step S230 enters.

On the other hand, in step S208, read are the newest slip amount data S(n) and the newest longitudinal acceleration data Xg which are calculated through the current processing of FIG. 3 and memorized in the memory 84d.

In step S238, read are the newest engine-revolution-speed indicative signal value Ne and the newest change-gear-ratio indicative signal value i from the automatic-transmission control unit 34.

In step S238c, a test is made to determine whether or not the current slip amount S(n) read at step S208 is greater than a predetermined threshold (a reference slip amount) $S_0$. In case of $S(n) > S_0$, step S239 proceeds. In case of $S(n) < S_0$, step S240 proceeds.

In step S239, a test is made to determine whether or not the slow-opening-control state indicative flag Fs is "1". In case of Fs=1, step S241 enters. In contrast, in case of Fs=0, step S242 enters.

In step S241, a test is made to determine whether or not the current slip amount S(n) is greater than a target slip amount S*(n). In case of S(n)>S*(n), step S243 proceeds. In case of S(n)≦S*(n), the procedure jumps to step S221.

In step S243 the slow-opening-control state indicative flag Fs is reset to "0", and then the procedure flows to step S242.

In step S242 a control flag FT is set at "1", and thereafter step S244 proceeds.

In step S244, a current value TFF(n) of a feed-forward term of a target driving torque (a target engine-power output) is calculated on the basis of the current value of the longitudinal acceleration Xg which is obtained by differentiating the mean front-wheel speed VwF (the mean non-driven wheel speed) and the change-gear ratio indicative signal value i, in accordance with the following expression (8).

$$T_{FF}(n) = W \cdot R\{1 + (I \cdot g/W \cdot R^2)\}(1/i)Xg \quad (8)$$

where W denotes a curb weight, R denotes a radius of the tire, I denotes a moment of inertia of the driving system of the vehicle, and g denotes an acceleration of gravity.

In step S245a, a current deviation ΔS(n) is calculated as a difference between the current slip amount S(n) read in through step S208 and the target slip amount S*(n), as follows.

$$\Delta S(n) = S(n) - S^*(n) \quad (10)$$

Thereafter, in step S245b, a test is made to determine whether or not the control flag FT is "1". In case of FT=1, step S246 enters. In case of FT=0, step S245c enters.

In step S246, read are the previous value ΔS(n−1) of the slip-amount deviation of the drive wheels and a previous value TFB(n−1) of a feed-back term of the target driving torque.

In step S247, in consideration of acceleration-slip at the drive wheels (the rear wheels), a current value TFB(n) of the feed-back term of the target driving torque is calculated on the basis of the current value ΔS(n) of the slip-amount deviation, the previous value ΔS(n−1) of the slip-amount deviation, and the previous value TFB(n−1) of the feed-back term of the target driving torque, in accordance with the following expression (11).

$$T_{FB}(n) = T_{FB}(n-1) - K_P\{\Delta S(n) - \Delta S(n-1)\} - K_I \Delta S(n) \quad (11)$$

where KP denotes a proportional control gain, while KI denotes an integration control gain.

Then, in step S248, the current value T*(n) of the target driving torque is calculated as the sum of the current feed-forward term TFF(n) derived at step S244 and the current feed-back term TFB(n) derived at step S247, as follows.

$$T^*(n) = T_{FF}(n) + T_{FB}(n) \quad (12)$$

In step S249, the current value θ*(n) of the target sub-throttle opening amount is calculated as a function of the current value T*(n) of the target driving torque and the current value Ne(n) of the engine revolution speed, in accordance with the following expression (13).

$$\theta^*(n) = g(T^*(n), Ne(n)) \quad (13)$$

In step S250, the previous value ΔS(n−1) of the slip-amount deviation is updated by the current value ΔS(n) calculated at step S245a, and additionally the previous value TFB(n−1) of the feed-back term of the target driving torque is updated by the current value TFB(n) calculated at step S247. These updated data are stored in the memory 84d, and then the procedure flows to step S232.

On the other hand, in step S240, a test is made to determine whether or not the slow-opening-control state indicative flag Fs is "1". In case of Fs=1, step S221 proceeds. In case of Fs=0, S251 proceeds in which the current value θ*(n) of the target sub-throttle opening amount is set at 100(%).

Thereafter, in step S252, the control flag FT is reset to "0" and then the procedure flows to step S244.

Also, in step S245c, the previous value ΔS(n−1) of the slipamount deviation is updated by the current value ΔS(n) calculated at step S245a, and additionally the previous value TFB(n−1) of the feed-back term of the target driving torque is updated by "0". Thereafter, the procedure jumps to step S232.

In the traction control system of the first embodiment which executes the processing shown in FIG. 5, the slow opening control of the sub-throttle can be effectively performed under a particular condition in which acceleration-slip (wheel-slip at the drive wheels) tends to occur easily and additionally the amount of the acceleration-slip cannot be reduced easily, for example when the friction-coefficient μ of the road surface is low, the car speed is low, and the accelerator opening amount A is great. Such a particular condition may take place in case that the driver recognizes a low-μ road condition for example on wet, snow or icy roads, and thus the car starts at a so-called snow-mode at which the gear ratio is held at a less gear ratio such as a second gear when starting. This particular condition is decided by way of four decision boxes in the flow chart shown in FIG. 5, namely steps S209, S210, S212 and S213, as already explained. In step S209, the shift-lever position indicative signal M is compared with "2" to decide as to whether the second gear speed is selected. In steps S210 and S212, the respective front wheel speeds VWFL and VWFR are compared with the predetermined speed Vw0 such as 5km/h. In step S213, the accelerator opening amount A is compared with the predetermined value $A_0$, for example ⅛. In the event that it is decided that the above-noted particular condition has been satisfied, the slow-opening-control state indicative Fs is set at "1" (See step S215). Thereafter, the current value θ*(n) of the target sub-throttle opening amount is set at "0", and then the throttle closed-state flag Fc is set at "1" (See the flow from step S205 to S207, and the flow from step S217 via step S218 to step S235). After setting the current target sub-throttle opening amount θ*(n) at "0", the actual opening amount of the sub-throttle 44 is adjusted to "0" via steps S232, S233 and S234. The fact that the above-noted setting condition θ*(n)=0 has been satisfied, can be discriminated by the decision box, namely step S206. As soon as the throttle-opening-amount indicative signal value TH reaches "0", the throttle closed-state indicative flag Fc is reset to "0" (See the flow from step S209 to step S219). Depending upon whether the road-surface friction-coefficient indicative flag Fμ is "1" or "0", the throttle-opening velocity Δθ is selectively set in accordance with the characteristics shown in FIG. 6. That is, when the flag Fμ is "0", i.e., in case that it is decided that the friction coefficient μ of the road surface is not below the predetermined low friction coefficient μo and thus the road surface condition does not correspond to a low-μ road, the throttle-opening velocity Δθ of the sub-throttle 44 is set to a comparatively greater value (See the upper straight line of the graph illustrated in FIG. 6), with the result that the car can be smoothly accelerated according to the driver's intention. In contrast, when the flag Fμ is "1", i.e., in the presence of output of decision-instruction of a low-μ road of a friction coefficient less than the predetermined low friction coefficient μo, the throttle-opening velocity Δθ is set to a comparatively smaller value (See the lower straight line of the graph illustrated in FIG. 6). In this manner, by properly selecting the control gain of the throttle-opening velocity Δθ, the car can be slowly accelerated with the throttle-opening velocity Δθ set at a low speed, for example during forward-starting on low-μ roads. As appreciated from steps S225, S226 and S227, on the basis of the calculated throttle-opening velocity Δθ and the previous value θ*(n−1) of the target sub-throttle opening amount, a current value θ*(n) of the target sub-throttle opening amount is newly calculated. If the calculated value θ*(n) of the target sub-throttle opening amount is equal to or less than 100, the calculated value is set as the current value θ*(n) of the target sub-throttle opening amount (See the flow from step S227 to step S228). Conversely, if the calculated value θ*(n) of the target sub-throttle opening amount is above 100, the slow-opening-control state indicative flag Fs is reset to "0", and then 100(%) is set as the current value θ*(n) of the target sub-throttle opening amount (See steps S229 and S231). It will be appreciated that the control of the sub-throttle opening, based on the throttle-opening velocity Δθ (depending on the friction coefficient μ of the road surface), corresponds to the slow opening control.

In the middle of the increasing operation for the target sub-throttle opening amount θ*(n) (calculated at step S226 of FIG. 5), the current value S(n) of the drive-wheel slip amount (calculated at step S304 of FIG. 3) will exceed the reference slip amount $S_0$ owing to the continuous increase in the calculated target sub-throttle opening amount θ*(n). As a result of this, excessive wheel-slip will occur at the drive wheels and thus the current drive-wheel slip amount S(n) will exceed the target slip amount S*(n). In this case, according to the flow from step S238c through steps S239, S241 and S243 to step S242, the slowopening-control indicative flag Fs is reset to "0" and additionally the control flag FT is set to "1". Thereafter, the procedure flows from step S242, through steps S244, S245a, S245b, S246 and S247 to step S248, and as a result that the sub-throttle control is transferred from the slow opening control (executed under the particular condition of the flag Fs=1) to a usual slip-suppression control (executed under the condition of the flag FT=1). As can be appreciated, the above-mentioned usual slip-suppression control utilizes both the feed-forward control (See the feed-forward term calculated at step S244) and the feed-back control (See the feed-back term calculated at step S247). As set forth above, in the event that the calculated value S(n) of the drive-wheel slip amount is above the reference slip amount $S_0$, the control flag FT is set to "1". The control flag FT will be hereinafter referred to as a "usual slip-suppression control state indicative flag". In case of the flag FT=1, the stepping motor 45 is driven in response to the current value θ*(n) of the target sub-throttle opening amount. For example, when the calculated current value θ*(n) of the target sub-throttle opening amount exceeds the detected throttle-opening-amount indicative signal value TH, the normal-rotation signal is output to the stepping motor 45, and thus the opening amount of the sub-throttle is increased. Conversely, when the calculated current value θ*(n) of the target sub-throttle opening amount is below the detected throttle-opening-amount indicative signal value TH, the reverse-rotation signal is output to the stepping motor 45, and thus the opening amount of the sub-throttle is decreased. As a result of the above-noted usual slip-suppression control, if the current value S(n) of the drive-wheel slip amount becomes below the reference slip amount $S_0$, the microcomputer 84 determines that no excessive wheel-slip occur, because of the drive-wheel slip amount less than the predetermined threshold. Thus, the current value θ*(n) of the target sub-throttle opening amount is set to 100% (See step S251 of FIG. 5), and as a result the sub-throttle 44 is maintained at its full-open position. Thereafter, in the event that the current value S(n) of the target slip amount becomes above the reference slip amount $S_0$ once again, the control procedure flows from step S238c through steps S239, S241 and S243 to S242, and thus executed is the usual slip-suppression control based on both the feed-forward term and the feed-back term. Assuming that the reference slip amount $S_0$ is pre-set to a comparatively small value close to zero, used as a previous value TFB(n−1) of the feed-back term is "0" (See step S245c) being equivalent to the deviation between the actual output driving torque and the current value TFF(n) of the feed-forward term of the target driving torque derived from the expression (8) (corresponding to step S244) in case that the current value θ*(n) of the target sub-throttle opening amount is set to 100%.

The operation of the traction control system of the first embodiment, which executes the procedures illustrated in FIGS. 3 and 5, will be hereinafter described in detail, in accordance with time charts of FIGS. 7(a), 7(b), 7(c) and 7(d).

The throttle opening-amount control (the driving-torque control), illustrated in the time charts of FIGS. 7(a), 7(b), 7(c) and 7(d), is based on the assumption that a friction coefficient μ of the actual road surface is a low value less than the predetermined friction coefficient μo when starting, but the driver quickly depresses the accelerator pedal for quick-start of the vehicle, performing a proper shifting operation (to the second range) in consideration of a possibility of occurrence of acceleration-slip. FIG. 7(a) shows variations in the accelerator-opening-amount indicative signal value A, FIG. 7(b) shows variations in the slow-opening-control state indicative flag Fs, FIG. 7(c) shows variations in the throttle-opening-amount indicative signal value TH of the sub-throttle 44, and FIG. 7(d) shows variations in the mean rear-wheel (drive-wheel) speed VwR and variations in the mean front-wheel (non-driven-wheel) speed VwF. In the time chart illustrated in FIG. 7(c), on the assumption that there is no time lag of the throttle-opening-amount indicative signal value TH to the target sub-throttle opening amount θ*, both the values TH and θ* are equivalent to each other. In FIGS. 7(c) and 7(d), the characteristic curve of the sub-throttle opening control based on the processing of the first embodiment is indicated by the solid line, while the characteristic curve of the prior-art slip-suppression control (never taking such a particular measure of the present invention as set out above) is indicated by the phantom line (two-dotted line). As seen in FIGS. 7(c) and 7(d), the characteristic curve of the prior-art slip-suppression control is differentiated from the characteristic curve of the sub-throttle opening control of the present invention, by adding a suffix (P) like TH(θ*P) and VwR(P). A throttle opening amount TH(S*) necessary for the target slip amount S* is indicated by the one-dotted line in FIG. 7(c). On the other hand, the one-dotted line of FIG. 7(d) indicates a reference speed VwRO corresponding to a threshold of the mean rear-wheel speed VwR. The threshold VwRO is obtained by adding the reference slip amount $S_0$ to the mean front-wheel speed VwF. The reference slip amount $S_0$ corresponds to a threshold value above which the prior-art usual slip-suppression control will be started owing to occurrence of acceleration-slip above an acceptable slip ratio.

Under the above-noted conditions, firstly the snow mode may be selected from a shift pattern. As a result of depression of the accelerator pedal at the time to, the detected accelerator-opening-amount indicative signal value A reaches a predetermined value Ao such as ⅛. Before the accelerator-opening-amount indicative signal value A is above the value $A_0$, the detected signal value M indicative of the shift-lever position is held at "2" every sampling time intervals $\Delta T_{s2}$ of the arithmetic processing of FIG. 5, and additionally the respective front wheel-speed indicative signal values VwFL and VwFR are essentially "0" and necessarily less than the predetermined speed $Vw_0$ such as 5km/h. In case of A<$A_0$, the slow-opening-control state indicative flag Fs is once set to "0" according to the flow from step S213 to step S211. However, the current value S(n) of the drive-wheel slip amount becomes "0" and is still less than the reference slip amount $S_0$, since the detected wheel-speed indicative signal values Vwj are all equal to "0" or nearly equal to "0". As a result, the current value θ*(n) of the target sub-throttle opening amount is set to 100% according to the flow from step S216 through steps S208, S238, S238c and S240 to step S251. Thereafter, the usual slip-suppression control state indicative flag FT is set to "0" at step S252, and the feed-forward term TFF(n) of the target driving torque is calculated as a function of the detected longitudinal acceleration indicative signal value Xg and the change-gear-ratio indicative signal value i in accordance with the expression (8), and additionally the current value ΔS(n) of the deviation of the drive-wheel slip amount is calculated on the basis of the target slip amount S*(n) and the current value S(n) of the drive-wheel slip amount, in accordance with the expression (10). In the above-noted case, since the usual slip-suppression control state indicative flag FT is equal to "0", the previous value ΔS(n–1) of the deviation of the drive-wheel slip amount is updated by the current value ΔS(n) of the deviation and the previous value TFB(n–1) of the feedback term of the target driving torque is updated by "0", according to the flow step S245b to step S245c. On the previously-described assumption, since the detected throttle-opening-amount indicative signal value TH is equal to the current value θ*(n) of the target sub-throttle opening amount (100%), the motor drive circuit 89 outputs neither the normal-rotation indicative signal nor the reverse-rotation indicative signal to the stepping motor 45. As a result, the motor 45 is not driven and thus the sub-throttle opening is held at 100%.

Under these conditions, suppose the accelerator is further depressed, and additionally the accelerator-opening-amount indicative signal value A exceeds the value $A_0$ such as ⅛ at the time t1, and linearly increased from the time t1 until the time t3, and held at a predetermined constant value (upper limit) AM such as ⅝ on and after the time t3, and also there is no excessive slip at the drive wheels until the time t4 will be reached from the time t3. Just after the time t1, the detected signal value M of the shift-lever position indicative signal, derived every sampling time interval $\Delta T_{s2}$, is held at "2", and the front-left and front-right wheel-speed indicative signal values VwFL and VwFR are almost "0" and below the predetermined speed Vw0, and additionally the accelerator-opening-amount indicative signal value A is above the value $A_0$. At this time, the control flag Fs representative of the sub-throttle slow-opening-control state is set to "1" at step S215, since the above-noted predetermined necessary condition (See steps S209, S210, S212 and S213) for the sub-throttle slow opening control is satisfied. As per the slow-opening-control state indicative flag Fs, the state of Fs=1 also means that the vehicle can start with a proper throttle-opening adjustment optimally adaptable to the occurrence of acceleration-slip at the drive wheels, irrespective of a rapid depression of the accelerator pedal.

For the first sampling time interval of the processing of FIG. 5, executed just after the time t1, the throttle closed-state indicative flag Fc is still held at "0", since the sub-throttle 44 is not yet held at its fully-closed position. Thus, the control flag Fc is set to "1"after setting the current value θ*(n) of the target sub-throttle opening amount to "0", according to the flow from step S217 via step S218 to step S235. At this time, since the detected throttle-opening-amount indicative signal value TH is "100%", and the current value θ*(n) of the target sub-throttle opening amount is "0", the reverse-rotation signal based on the deviation of the two values TH and θ*(n) is output to the motor drive circuit 89. As a result, the stepping motor 45 is driven in the direction of reverse-rotation, and then the opening amount of the sub-throttle 44 is decreasingly adjusted to the current target sub-throttle opening amount θ*(n) (=0) by way of the reverse-rotation of the motor. As set forth above, since the throttle closed-state indicative flag Fc has been already set to "1" just after the first sampling time interval, a test is made on the basis of the detected signal value TH of the throttle opening amount so as to determine whether or not the actual sub-throttle opening reaches "0", during sampling operation executed after the first sampling time interval. At step S206, if the detected value TH of the throttle opening amount is not yet "0", i.e., in case of TH ≠0, the current value θ*(n) of the target sub-throttle opening amount is set to "0" again at step S220. If it is assumed that the actual opening amount of the sub-throttle 44 reaches "0", the control flag Fc is reset to "0" at step S219. Thereafter, at step S221, a test is made to determine whether the road-surface friction-coefficient indicative flag Fμ is set to "1" via the processing of FIG. 3. Based on the above-noted assumption that the friction coefficient μ of the road surface is low, the control flag Fμ is set to "1". Thus, a comparatively smaller proportional constant a, which is suitable for the low-μ road surface, is set as the gain $K_3$ at step S222, and thereafter a proper throttle-opening velocity Δθ is calculated depending on the accelerator-opening-amount indicative signal value A at step S224. At step S226, the current value θ*(n) of the target sub-throttle opening amount is newly calculated by adding the throttle-opening velocity Δθ to the previous value θ*(n−1) of the target sub-throttle opening amount. In case that the newly-calculated current value θ*(n) of the target sub-throttle opening amount is maintained below 100%, the current value θ*(n) of the target sub-throttle opening amount, stored in the memory 84d, is updated by the above-calculated value. The updated current value θ*(n) of the target sub-throttle opening amount is newly memorized in the memory 84d as the previous value θ*(n−1) of the target sub-throttle opening amount. As seen in FIG. 7(c), after the time t1, during sampling operation executed for the above-noted first sampling time interval or during another sampling operation earlier executed after the first sampling operation, the actual throttle opening amount of the sub-throttle becomes "0", and thereafter the depression of the accelerator pedal is further continued. Thus, the detected throttle-opening-amount indicative signal value TH is less than the current value θ*(n) of the target sub-throttle opening amount. Depending upon the deviation between the current value θ*(n) of the target sub-throttle opening amount and the detected throttle-opening-amount indicative signal value TH, the normal-rotation signal is output to the motor drive circuit 89. As a result, the stepping motor 45 is driven in the direction of normal-rotation, and thus the sub-throttle opening is increasingly adjusted to the throttle-opening amount TH(θ*) corresponding to the current target sub-throttle opening amount θ*(n).

During sampling after the throttle closed-state indicative flag Fc is reset to "0" at step S219, the slow-opening-control state indicative flag Fs remains kept at "1". The slow opening control of the sub-throttle 44 is executed in such a manner as to gradually increase the sub-throttle opening at the calculated throttle-opening velocity Δθ, even in the presence of output of decision-instruction representing that the current value S(n) of the drive-wheel slip amount is less than the threshold $S_0$ before the time t4. For the time interval between the time t1 and the time t3, the accelerator-opening-amount A varies, and thus the throttle-opening velocity Δθ of the sub-throttle 44 also varies (See step S224). After the time t3, since the accelerator-opening-amount A is held at the predetermined constant value Am, the throttle-opening velocity Δθ of the sub-throttle is also maintained constant. Therefore, as seen in FIG. 7(c), the throttle-opening amount TH of the sub-throttle 44 varies in the form of a downwardly-curved quadratic curve for the time interval between the time t1 and the time t3. Until the time t4 after the time t3, the throttle-opening amount TH of the sub-throttle 44 varies linearly. Suppose that the drive-wheel slip amount develops excessively at the time t4. Similar to the sampling time interval close to the time t3, the microcomputer decides that the current value S(n) of the slip amount exceeds the target slip amount S*(n). At the time t4, since the slow-opening-control state indicative flag Fs is still maintained at "1", the control flag Fs is reset to "0" at step S243, and in lieu thereof the usual slip-suppression control indicative flag FT is set at "1" at step S242, so as to shift from the sub-throttle slow-opening control to the usual slip-suppression control. Thereafter, by way of the flow from step S244 through steps S245a, S245b and S246 to step S247, the current value TFF(n) of the feed-forward term and the current value TFB(n) of the feed-back term are calculated according to the expressions (8) and (11), respectively. The current value T*(n) of the target driving torque is derived from the calculated two values TFF(n) and TFB(n) (See step S248 or the expression (12)). In the usual slip-suppression control, the current value θ*(n) of the target sub-throttle opening amount is calculated as a function of the current value T*(n) of the target driving torque and the current engine revolution-speed indicative signal value Ne(n) in accordance with the expression (13) (See step S249). Then, the current value ΔS(n) of the slip-amount deviation of the drive wheels and the current value TFB(n) of the feed-back term of the target driving torque are stored in the memory 84d as their previous values ΔS(n−1) and TFB(n−1). By comparison between the throttle-opening-amount indicative signal value TH and the current value θ*(n) of the target sub-throttle opening amount, the microcomputer 84 generates the normal-rotation signal based on the deviation between the two values θ*(n) and TH in case of θ*(n)>TH, and generates the reverse-rotation signal based on the deviation in case of θ*(n)<TH. The stepping motor 45 is driven in the direction of normal-rotation or reverse-rotation by the angular steps depending upon the deviation between the two values θ*(n) and TH. In this manner, the actual opening amount of the sub-throttle 44 is increasingly or decreasingly adjusted to the throttle opening amount TH(θ*) corresponding to the current target sub-throttle opening amount θ*(n). After the transition point (the time t4) from the sub-throttle slow-opening control to the usual slip-suppression control, the current value TFF(n) of the feed-forward term of the target driving torque is held at a constant value which is calculated by the expression (8) by utilizing the longitudinal acceleration Xg derived during sampling just before the time t4. Thus, the throttle opening amount TH(S*) necessary for the target slip amount S* is also held constant (See the right-hand side of FIG. 7(c)). The throttle opening amount TH(θ*) which corresponds to the current target sub-throttle opening amount θ*(n) or is derived as a function of the amount θ*(n), can be set by adding the current feed-back term TFB(n) based on the current value ΔS(n) to the above-noted throttle opening amount TH(S*). By way of such a usual slip-suppression control, the excessive acceleration-slip at the drive wheels 10RL and 10RR is effectively suppressed, and thus the vehicle can be accelerated with a substantially constant acceleration, with the result that the mean rear-wheel speed VWR is converged to the reference speed (threshold) VWr0 which is determined to satisfy the target slip amount S*(n).

Owing to the usual slip-suppression control, when the drive-wheel slip amount S(n) becomes below the reference slip amount $S_0$, through the flow from step S238c through steps S240 and S251 to step S252, the current value θ*(n) of the target sub-throttle opening amount is set to 100% and the control flag FT is reset to "0", since the slow-opening-control state indicative flag Fs has been already set to "0" and there is no excessive drive-wheel slip amount. Thereafter, since the control flag FT is "0", the procedure flows from step S245b to step S245c, with the result that the current value ΔS(n) of the drive-wheel slip amount is stored as the previous value ΔS(n−1), while the value "0" is stored as the previous value TFB(n−1) of the feed-back term of the target driving torque. Thereafter, depending on the deviation between the current target sub-throttle opening amount θ*(n) (already set at 100%) and the detected value TH of the throttle opening amount, the normal-rotation signal is output to the motor drive circuit 89 to provide an angular step based on the deviation. In this manner, the opening amount of the sub-throttle 44 is increased to 100%. After this, the opening amount of the sub-throttle 44 is held at 100% and the sub-throttle control (the driving torque control) is not executed, until the drive-wheel slip amount becomes excessively great and thus the current slip amount S(n) exceeds the target slip amount S*(n).

In contrast to the above, in case of quick-start on a low-μ road of the friction coefficient greater than the predetermined friction coefficient μ0 with the shift lever position held at the second range, the road-surface friction-coefficient indicative flag Fμ will be set at "0" through the processing of FIG. 3. In this case, a comparatively larger proportional constant b, which is suitable for the high-μ road surface for example, will be set as the gain $K_3$ at step S223. Therefore, in FIG. 7(c), the grade of the downwardly-curved quadratic curve between t1 and t3 and the grade of the straight line between t3 and t4 may become steeper so as to rapidly increase the throttle opening amount TH, and as a result the vehicle can be accelerated quickly and smoothly according to the driver's intention of accelerating, unless the control flag Fμ is shifted from "0" to "1" owing to lowering of the friction coefficient μ of the road surface during driving or excessive acceleration-slip occurs again.

As will be appreciated from the above, in the case that the driver judges that acceleration-slip will occur when starting and performs a proper shifting operation suitable for suppression of the acceleration-slip, the sub-throttle 44 is set at its fully-closed position once, and thereafter the sub-throttle 44 begins to open at a throttle-opening velocity which velocity is dependent upon both the accelerator opening amount and the road-surface condition such as the magnitude of the friction coefficient μ of the road surface. Therefore, irrespective of rapid depression of the accelerator pedal, the vehicle is gradually accelerated slowly in the presence of output of decision-instruction representative of a low-μ road of a friction coefficient below than the predetermined friction coefficient μ0, thus reliably suppressing acceleration-slip which would occur easily at the drive wheels when starting on a low-μ road.

Hitherto, only the usual slip-suppression control was performed as a throttle opening control. Therefore, even when the engine revolution-speed is decreasingly controlled by shifting a sub-throttle to its closed position through the usual slip-suppression control based on both a feed-forward control and a feed-back control, there is a slight time lag, until changes in engine-power output based on the engine revolution-speed decreasingly controlled, will be actually reflected as changes in driving torque of the drive wheels. Particularly in the automobiles with a torque converter, such a time lag is relatively great. In addition to the above, the driving-torque decrement, which corresponds to the decreasingly controlled engine revolution-speed, may not be reflected as a change in the drive-wheel speed, owing to a torque-multiplication action of the torque converter. For the reasons set out above, in case of only the normal slip-suppression control executed by the prior-art traction control system, as indicated by the phantom line of FIG. 7(c) and 7(d), the mean rear-wheel speed VwR(P) will exceed the reference wheel speed VwR0 at the time t2 for example, and thus the usual slip-suppression control will begin earlier at the time t2. Immediately, the opening amount of the sub-throttle 44 will be set at a throttle opening amount TH(S*) based on a target slip amount S* which can be derived through the feed-forward control. In this manner, in case of occurrence of excessive wheel-slip at the beginning of starting the vehicle, the throttle opening amount is decreasingly adjusted to approximately zero, and thus the engine revolution-speed is also decreasingly controlled. However, the decreasingly controlled engine revolution-speed may be reflected as a decrease in the drive-wheel speed with a remarkable time lag, resulting from a comparatively large delay of engine-power transmission of the torque converter and a torque-multiplication action of the torque converter. As set out above, it takes a relatively long delay-time required for reducing the mean drive-wheel speed VwR(P). In case of the conventional throttle opening control utilizing only the usual slip-suppression control, it takes a comparatively long time to suppress the acceleration-slip of the rear wheels.

Second Embodiment

Figure 8:
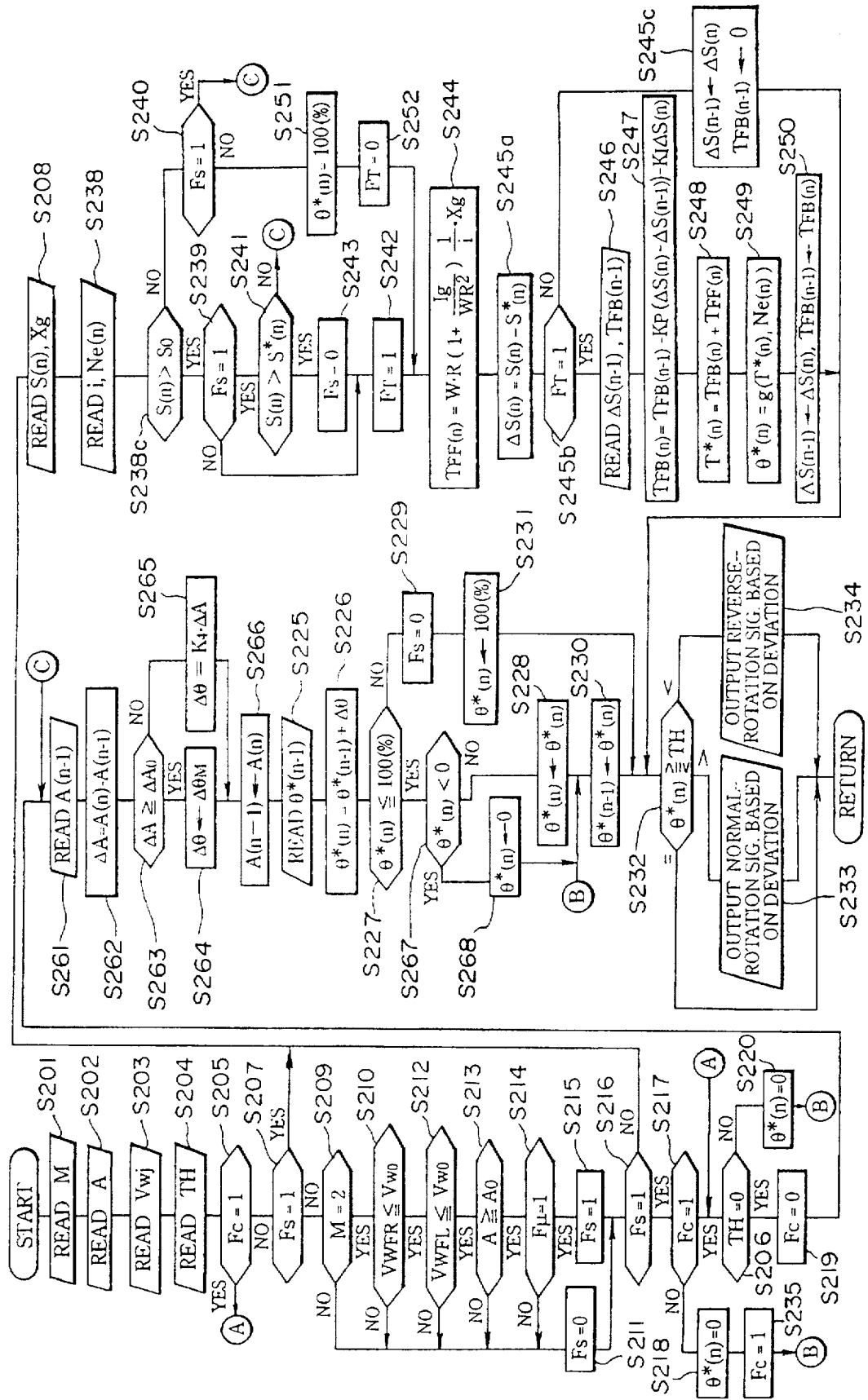
FIG. 8 is a flow chart illustrating an arithmetic processing for a driving-torque control executed by a second embodiment of the traction control system.

Referring now to FIG. 8, there is shown an arithmetic processing executed by a microcomputer employed in the second embodiment of the traction control system made according to the invention. The basic procedure of the arithmetic processing of the second embodiment as shown in FIG. 8 is similar to that of the first embodiment as shown in FIG. 5. Therefore, the same steps used in the first embodiment of FIG. 5 will be applied to the corresponding steps used in the second embodiment of FIG. 8, for the purpose of comparison between the first and second embodiments. The processing for the sub-throttle opening control of the second embodiment will be hereinafter described briefly in accordance with the flow chart shown in FIG. 8. As seen in FIG. 8, the processing for the sub-throttle opening control of the second embodiment is different from that of the first embodiment in that step S214 is newly added between steps S213 and S215, and that steps S221 to S224 in FIG. 5 are replaced with steps S261 to S266, and that steps S267 and S268 are newly added between steps S227 and S228.

In step S214, a test is made to determine whether or not the road-surface friction-coefficient indicative flag Fμ is set at "1". In case of Fμ=1, i.e., when the road surface is a low-μ road surface of a friction coefficient below the predetermined friction coefficient μ0, step S215 proceeds. In case of Fμ=0, i.e., when a friction coefficient μ of the road surface is above the predetermined friction coefficient μ0, step S211 proceeds.

In step S261, read in the previous value A(n−1) of the accelerator opening amount, derived through the sampling operation executed one cycle before.

In step S262, the detected value A of the accelerator opening amount read at step S202 is set as the current value A(n) of the accelerator opening amount, and a variation ΔA is calculated by subtracting the previous value A(n−1) from the current value A(n). The variation ΔA can be regarded as an accelerator opening velocity or a rate-of-change of the accelerator opening amount A.

In step S263, a test is made to determine whether or not the calculated variation ΔA of the accelerator opening amount is equal to or greater than a predetermined threshold $ΔA_0$ of the accelerator opening velocity. Step S264 enters in case of $ΔA ≧ ΔA_0$, whereas step S265 enters in case of $ΔA < ΔA_0$.

In step S264, a pre-set throttle-opening velocity upper limit Δθм is set as the throttle-opening velocity Δθ, and thereafter step S266 proceeds.

In step S265, the throttle-opening velocity Δθ is calculated as a function of the variation ΔA calculated at step S262, in accordance with the following expression (18).

$$\Delta\theta = K_4 \times \Delta A \qquad (18)$$

where $K_4$ denotes a predetermined proportional constant.

In step S266, the previous value A(n−1) of the accelerator opening amount is updated by the detected value A of the accelerator opening amount read at step S202 (the current accelerator opening amount A(n)), and then step S225 enters.

In step S267, a test is made to determine whether or not the current value θ*(n) of the target sub-throttle opening amount is less than "0". Step S268 enters in case of θ*(n)<0, whereas step S228 enters in case of θ*(n)>0.

In step S268, the current value θ*(n) of the target sub-throttle opening amount is set at "0", and thereafter the procedure flows to step S230.

According to the arithmetic processing of the traction control system of the second embodiment, under a particular condition in which acceleration-slip will occur, that is, when a friction coefficient μ of the road surface is low, the vehicle speed is low, and additionally the accelerator opening amount is great, a slow opening control of the sub-throttle is performed as follows. Except the above-noted particular condition, the usual slip-suppression control is executed in the same manner as the first embodiment.

Figure 9:
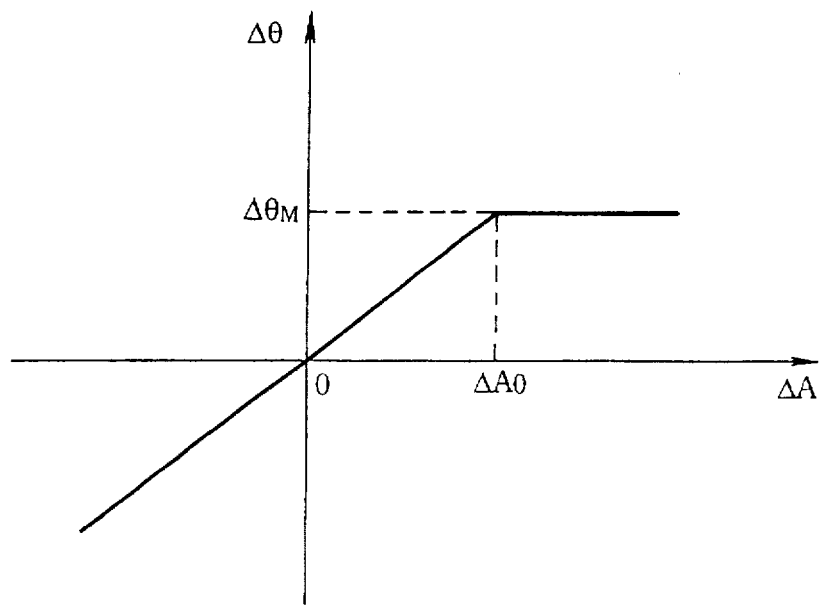
FIG. 9 is a graph illustrating the relationship between a variation (an accelerator opening velocity) ΔA of the accelerator-opening-amount indicative signal value A and an opening velocity Δθ of the sub-throttle.

In the second embodiment, for the purpose of beginning the slow opening control of the sub-throttle, five decision boxes, consisting of step S214 as well as steps S209, S210, S212 and S213, are provided as seen in FIG. 8. In the event that all of the answers at the five decision boxes was affirmative (YES), the slow-opening-control state indicative flag Fs is set at "1", and the current value θ*(n) of the target sub-throttle opening amount is set at "0", and then the throttle closed-state indicative flag Fc is set at "1". As soon as the throttle-opening-amount indicative signal value TH reaches "0" in response to the current target sub-throttle opening amount θ*(n) set at "0", the throttle closed-state indicative flag Fc is reset to "0". Thereafter, the throttle-opening velocity Δθ is properly set depending on the variation ΔA of the accelerator opening amount, utilizing the graph illustrated in FIG. 9, showing the correlation between the variation (the accelerator opening velocity) ΔA and the throttle-opening velocity Δθ. As can appreciated from steps S263, S264 and S265 and the graph illustrated in FIG. 9, the throttle-opening velocity Δθ is calculated according to the expression (18) in case that the variation ΔA is less than the predetermined threshold $\Delta A_0$, and set at the pre-set upper limit ΔθM in case that the variation ΔA is equal to or greater than the predetermined threshold $\Delta A_0$. According to the expression (15), the current value θ*(n) of the target sub-throttle opening amount is calculated as the sum of the pervious value θ*(n−1) of the target sub-throttle opening amount and the calculated throttle-opening velocity Δθ, in accordance with the expression (15). In case that the calculated value θ*(n) of the target sub-throttle opening amount is equal to or less than 100 and equal to or greater than 0, the calculated value is set as the current value θ*(n) of the target sub-throttle opening amount (See the flow from step S227 via step S267 to step S228). In case that the calculated value θ*(n) of the target sub-throttle opening amount is above 100, the slow-opening-control state indicative flag Fs is reset to "0" (at S229), and then 100(%) is set as the current value θ*(n) of the target sub-throttle opening amount (See step S231). In case that the calculated value θ*(n) of the target sub-throttle opening amount is less than 0, "0" is set as the current value θ*(n) of the target sub-throttle opening amount (See steps S267 and S268). Similarly to the first embodiment, in the middle of the increasing/decreasing operation for the target sub-throttle opening amount θ*(n) (calculated at step S226 of FIG. 8), if the current value S(n) of the drive-wheel slip amount (calculated at step S304 of FIG. 3) exceeds the reference slip amount $S_0$, and also exceeds the target slip amount S*(n) owing to excessive drive-wheel slip (acceleration-slip), the slow-opening-control state indicative flag Fs is reset to "0" according to the flow from step S238c through steps S239 and S241 to step S243, and additionally the control flag FT is set to "1" at step S242. Thereafter, the sub-throttle control is transferred from the slow opening control of the sub-throttle to the usual slip-suppression control utilizing both the feed-forward control and the feed-back control.

The operation of the traction control system of the second embodiment, which executes the procedures illustrated in FIGS. 3 and 8, will be hereinafter described briefly, in accordance with time charts of FIGS. 10(a) and 10(b).

Figure 10:
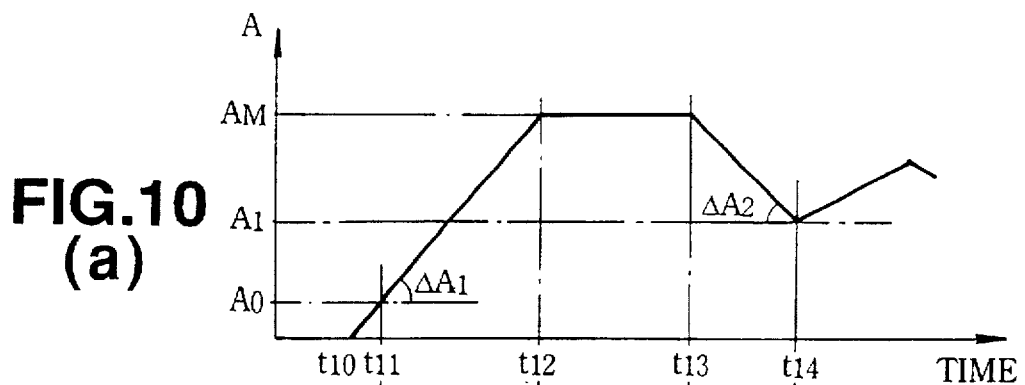
FIGS. 10(a) and 10(b) are time charts, explaining the operation of the driving-torque control executed according to the flow chart shown in FIG. 8.
Figure 10:
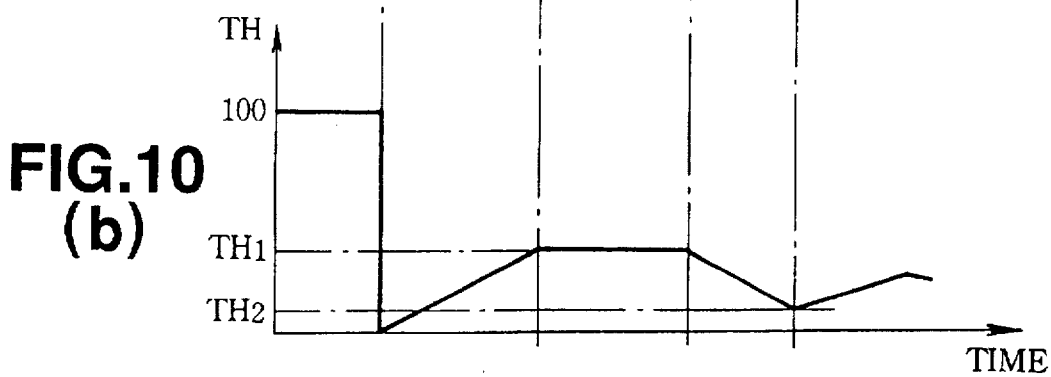

The throttle opening-amount control, illustrated in the time charts of FIGS. 10(a) and 10(b), is based on the assumption that a friction coefficient μ of the actual road surface is a low value less than the predetermined friction coefficient μo when starting, but the driver quickly depresses the accelerator pedal for quick-start of the vehicle, selecting a snow mode in consideration of a possibility of occurrence of acceleration-slip, and the main throttle 48 is once shifted to its full-open position, and then the driver properly adjusts the depression of the accelerator pedal. FIG. 10(a) shows variations in the accelerator-opening-amount indicative signal value A, while FIG. 10(b) shows variations in the throttle-opening-amount indicative signal value TH of the sub-throttle 44. In the time chart illustrated in FIG. 10(b), on the assumption that there is no time lag of the throttle-opening-amount indicative signal value TH to the target sub-throttle opening amount θ*, both the values TH and θ* are equivalent to each other. In FIG. 10(b), a sub-throttle opening amount TH(S*) necessary to satisfy the target slip amount S* is indicated by the one-dotted line.

In the stopping state of the car, the driver may select a snow mode. At the time t10, the driver starts to depress the accelerator pedal. Suppose the accelerator-opening-amount indicative signal value A reaches a predetermined value $A_0$ (for example ⅛) at the time t11. The control procedure executed for the time interval between t10 and t11 in FIGS. 10(a) and 10(b), is identical to that for the time interval between t0 and t1 in FIGS. 7(a) and 7(c). Thus, the actual opening amount of the sub-throttle 44 is held at 100%. As soon as the throttle opening amount indicative signal value A exceeds the value $A_0$ (⅛), continuing the depression of the accelerator pedal, the slow-opening-control state indicative flag Fs is set at "1" for the earliest sampling time interval after the time t11, since the condition of Fμ=1 is satisfied on the assumption of a low-μ road of a friction coefficient less than the predetermined low friction coefficient μo. Thus, through the earliest sampling operation after the time t11, that is, as soon as the elapsed time has been reached the time t11, the opening amount of the sub-throttle 44 is rapidly reduced to "0" with the throttle closed-state indicative flag Fc set at "1". For the time interval between t11 and t12, assuming that the accelerator opening amount A increases linearly at a comparatively high speed $\Delta A_1$ ($\geq \Delta A_0$) until the accelerator opening amount reaches the upper limit AM such as ⅝ (corresponding to the full-open state of the accelerator) at the time t12, the variation (the accelerator opening velocity) ΔA, calculated at step S262, exceeds the predetermined threshold ΔA₀. Under these conditions, the pre-set throttle-opening velocity upper limit Δθm is set as the throttle-opening velocity Δθ at step S264, and the current value A(n) of the accelerator opening amount is stored in the memory as a previous value A(n−1). Therefore, for the time interval from t1 to t12, the opening amount of the sub-throttle 44 increases linearly from "0" up to a certain value $TH_1$ at the pre-set throttle-opening velocity ΔθM, as seen in FIG. 10(b). Suppose the accelerator opening amount A is held at the upper limit AM (⅝) for the time interval between t12 and t13. For this time interval, the accelerator opening velocity ΔA is maintained at "0" and thus the throttle opening velocity Δ74 is held at "0", with the result that the throttle opening amount TH is held at the value $TH_1$. Suppose the accelerator opening amount A decreases linearly at a certain speed $\Delta A_2$ (<ΔA₀) from the upper limit AM down to a value $A_1$ ($A_0 < A_1 <$ AM) owing to the release operation of the accelerator pedal at the time t13 and the accelerator opening amount A reaches the value $A_1$ at the time t14. Between t13 and the t14, the variation (the accelerator opening velocity) ΔA is negative, and thus the throttle opening velocity Δθ becomes less than "0". The current value θ*(n) of the target sub-throttle opening amount, obtained as the sum of the previous value θ*(n−1) and the negative throttle opening velocity Δθ, is necessarily reduced every sampling time intervals. As a result, the throttle opening amount $TH_1$ is decreased to another value $TH_2$ at the time t14. Thereafter, supposing that the drive further depresses the accelerator pedal, the throttle opening amount TH may increase again in response to the positive variation ΔA. In the second embodiment, in case that the calculated value θ*(n) of the target sub-throttle opening amount is less than "0" owing to the minus variation ΔA, the current value θ*(n) of the target sub-throttle opening amount is set at "0" through the flow from step S267 to step S268, and then the throttle opening amount TH is adjusted to zero. In this manner, since the sub-throttle opening can be increasingly or decreasingly controlled essentially in synchronization with the accelerator-pedal work of the driver, the state of the drive-wheel slip amount S(n) below the reference slip amount S₀ will continue for a while. However, as soon as the slip amount S(n) exceeds the reference slip amount S₀, the usual slip-suppression control starts in the same manner as the control operation executed after the time t4 of FIG. 7(c) in the first embodiment.

As set forth above, in the event that the veteran driver properly adjusts the depression of the accelerator pedal during acceleration-starting at the snow mode on a low-μ road, the sub-throttle opening as well as the main throttle opening can be controlled in response to the accelerator opening amount A. Therefore, the traction control system of the second embodiment is superior to that of the first embodiment, in that the system of the second embodiment can suppress acceleration-slip more effectively depending on the accelerator-pedal work of the veteran driver during acceleration-starting.

Third Embodiment

Figure 11:
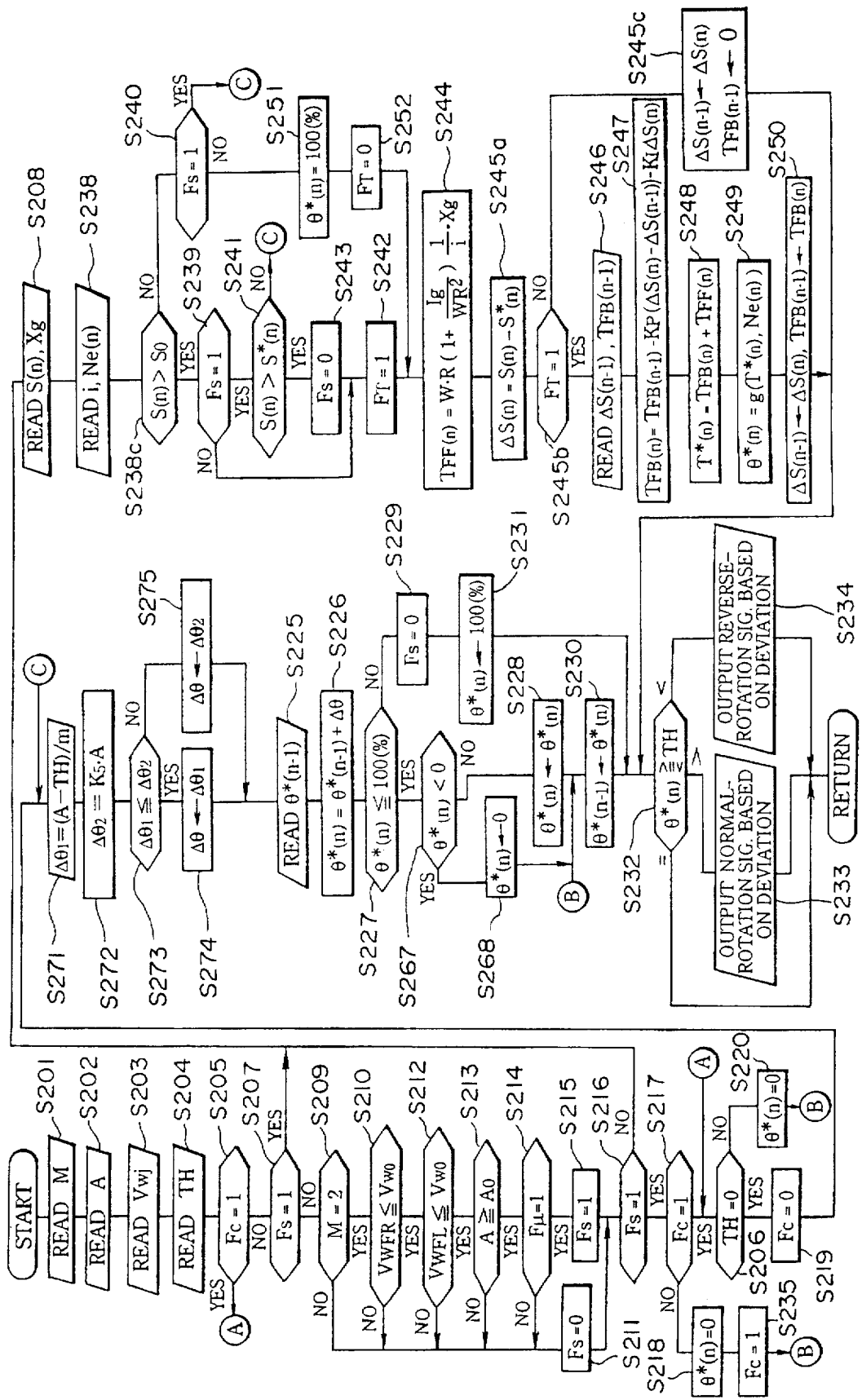
FIG. 11 is a flow chart illustrating an arithmetic processing for a driving-torque control executed by a third embodiment of the traction control system.

Referring now to FIG. 11, there is shown an arithmetic processing executed by a microcomputer employed in the third embodiment of the traction control system made according to the invention. The basic procedure of the arithmetic processing of the third embodiment as shown in FIG. 11 is similar to that of the second embodiment as shown in FIG. 8. Therefore, the same steps used in the second embodiment of FIG. 8 will be applied to the corresponding steps used in the third embodiment of FIG. 11, for the purpose of comparison between the second and third embodiments. The processing for the sub-throttle opening control of the third embodiment will be hereinafter described briefly in accordance with the flow chart shown in FIG. 11. As seen in FIG. 11, the processing for the sub-throttle opening control of the third embodiment is different from that of the second embodiment in that steps S261 to S266 of FIG. 8 are replaced with steps S271 to S275.

In step S271, a first throttle opening velocity $\Delta\theta_1$ is calculated as a function of the detected acceleration opening amount A read at step S202 and the detected throttle opening amount TH read at step S204, in accordance with the following expression (19).

$$\Delta\theta_1 = (A-TH)/m \qquad (19)$$

where m denotes a pre-set constant.

In step S272, a second throttle opening velocity $\Delta\theta_2$ is calculated as a function of the detected acceleration opening amount A, in accordance with the following expression (20).

$$\Delta\theta_2 = K_5 \times A \qquad (20)$$

where $K_5$ is a pre-set proportional constant, and preferably the proportional constant $K_5$ is a proportional gain a (0<a<1, See FIG. 6) as selected in case of Fμ=1 in the first embodiment.

In step S273, a test is made to determine whether or not the first throttle opening velocity $\Delta\theta_1$ is equal to or less than the second throttle opening velocity $\Delta\theta_2$. Step S274 enters in case of $\Delta\theta_1 \leq \Delta\theta_2$, whereas step S275 enters in case of $\Delta\theta_1 > \Delta\theta_2$.

In step S274, the first throttle opening velocity Δθ1 is set as a throttle opening velocity Δθ of the sub-throttle 44 and then the procedure flows to step S225.

In step S275, the second throttle opening velocity Δθ1 is set as the throttle opening velocity Δθ, and then the procedure flows to step S225.

As appreciated, in the third embodiment, a slow opening control of the sub-throttle is performed under the previously-explained particular condition, such as when quickly starting on a low-μ road, whereas a usual slip-suppression control is performed except the particular condition. The setting procedure for the control flags Fs and Fc in the third embodiment is identical to the second embodiment.

According to the arithmetic processing of the third embodiment, the first throttle opening velocity Δθ1 is calculated as a function of both the accelerator opening amount A depending on the accelerator-pedal work of the driver and the actual sub-throttle opening amount TH based on the target sub-throttle opening amount θ*(n). Almost simultaneously, the second throttle opening velocity Δθ2 is calculated as a function of only the accelerator opening amount A. In other words, the first throttle opening velocity Δθ1 is based on the deviation (A−TH) between the values A and TH, while the second throttle opening velocity Δθ2 is based on only the value A. Every sampling time intervals, the first throttle opening velocity Δθ1 is compared with the second throttle opening velocity Δθ2, and then the lower one of the two velocities Δθ1 and Δθ2 is selected as the current throttle opening velocity Δθ. That is, three steps S273, S274 and S275 correspond to a select-LOW process for the throttle opening velocity Δθ. In the third embodiment, the above-noted constant m is preset so that a condition of (Δθ1>Δθ2) can be satisfied always in case of the deviation (A−TH)>0. Conversely, in case of the deviation (A−TH)≦0, a condition of (Δθ1<Δθ2) is satisfied.

Accordingly, the second throttle opening velocity Δθ2 is selected in case of the deviation (A−TH)>0, whereas first throttle opening velocity Aθi is selected in case of the deviation (A−TH)≦0. Thereafter, at step S226, the current value θ*(n) of the target sub-throttle opening amount is derived from the previous value θ*(n−1) of the target sub-throttle opening amount and the throttle opening velocity Δθ obtained through the select-LOW process, in accordance with the expression (15). In case of 0≦θ*(n)<100, the calculated value obtained at step S226 is set as the current value θ*(n). In case of θ*(n)>100, the slow-opening-control state indicative flag Fs is reset to "0" and then 100(%) is set as the current value θ*(n). In case of θ*(n)<0, "0" is set as the current value θ*(n). Therefore, in the event that the accelerator opening amount A becomes below the sub-throttle opening amount TH due to the returning action of the accelerator, the first throttle opening velocity Δθ1 is selected because of the deviation (A−TH)<0. As can be appreciated from the expression (19) or step S271, the first throttle opening velocity Δθ1 is a minus value, and thus the throttle opening amount of the sub-throttle 44 is set to a smaller value than its previous value. Therefore, in the same manner as the second embodiment, the traction control system of the third embodiment can suppress acceleration-slip more effectively and precisely depending on the accelerator-pedal work of the veteran driver during acceleration-starting. Similarly to the second embodiment, in the middle of the increasing/decreasing operation for the target sub-throttle opening amount θ*(n), if the current value S(n) of the drive-wheel slip amount exceeds the reference slip amount $S_0$, and also exceeds the target slip amount S*(n), the slow-opening-control state indicative flag Fs is reset to "0", and additionally the control flag Fт is set to "1", and thereafter the sub-throttle control is transferred from the slow opening control to the usual slip-suppression control utilizing both the feed-forward control and the feed-back control.

The operation of the traction control system of the third embodiment, which executes the procedures illustrated in FIGS. 3 and 11, will be hereinafter described briefly, in accordance with the time chart of FIG. 12.

Figure 12:
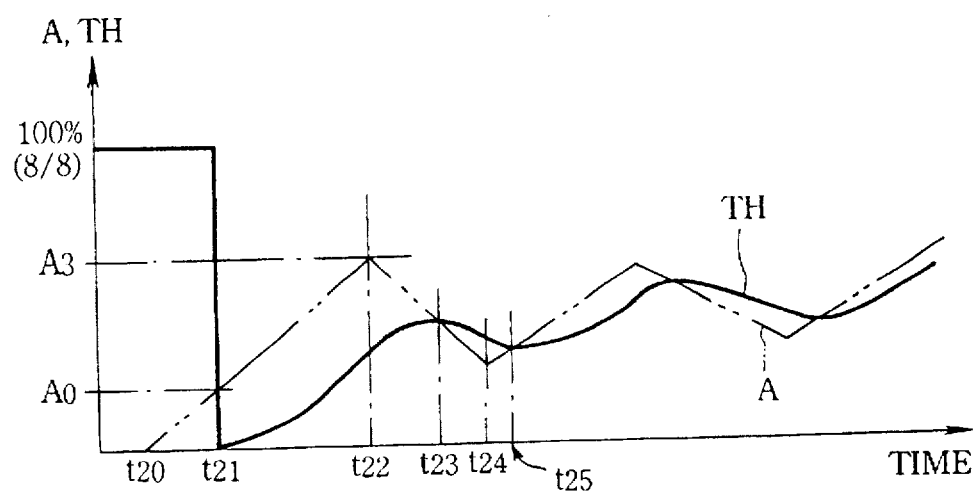
FIG. 12 is a time chart explaining the operation of the driving-torque control executed according to the flow chart shown in FIG. 11.

The throttle opening-amount control, illustrated in the time chart of FIG. 12, is performed under the same condition as the second embodiment. The two-dotted line of FIG. 12 shows the variations in the accelerator-opening-amount indicative signal value A, while the solid line of FIG. 12 shows variations in the throttle-opening-amount indicative signal value TH of the sub-throttle 44. In the time chart illustrated by the solid line in FIG. 12, on the assumption that there is no time lag of the throttle-opening-amount indicative signal value TH to the target sub-throttle opening amount θ*, both the values TH and θ* are equivalent to each other.

In the stopping state of the car, the driver may select a snow mode. At the time t20, the driver starts to depress the accelerator pedal. Suppose the accelerator-opening-amount indicative signal value A reaches a predetermined value Δθ (⅛) at the time t21. The control procedure executed for the time interval between t20 and t21 in FIG. 12, is identical to that for the time interval between t10 and t11 in FIGS. 10(a) and 10(b).

Thus, the opening amount of the sub-throttle 44 is held at 100%.

As soon as the throttle-opening-amount indicative signal value A exceeds the value $A_0$ (⅛), continuing the depression of the accelerator pedal, the slow-opening-control state indicative flag Fs is set at "1" for the earliest sampling time interval after the time t21, since the condition of Fμ=1 is satisfied on the assumption of a low-μ road of a friction coefficient less than the predetermined low friction coefficient μo. Thus, through the earliest sampling operation after the time t21, that is, as soon as the elapsed time has been reached the time t21, the opening amount of the sub-throttle 44 is rapidly reduced to "0" with the throttle closed-state indicative flag Fc set at "1". For the time interval between t21 and t22, suppose the accelerator opening amount A increases linearly up to a value $A_3$ slightly less than the upper limit AM (⅝). Then, the first and second throttle opening velocities Δθ1 and Δθ2 are calculated respectively in accordance with the expressions (19) and (20). At the time t21, the accelerator opening amount A is essentially equal to the predetermined value $A_0$ (⅛), while the throttle opening amount TH is still zero. Thus, at the time point t21, the deviation (A−TH) is greater than "0", and thus the decision-instruction indicative of Δθ1>Δθ2 is output, and as a result the second throttle opening velocity Δθ2 is selected as a throttle-opening velocity Δθ through the select-LOW process. Suppose the deviation (A−TH) is above "0" for the time interval between t21 and t22, since the selected throttle opening velocity Δθ is small. For this time interval from t21 to t22, the throttle opening amount TH of the sub-throttle 44 is gradually increased in the form of a downwardly-curved quadratic curve, in the same manner as the control operation executed for the time interval between t1 to t3, as illustrated in FIG. 7(c) in the first embodiment. Suppose the accelerator opening amount A decreases linearly for the time interval between t22 and t24 owing to release operation of the accelerator pedal at the time t22 and the accelerator opening amount A becomes equal to the throttle opening amount TH at the time t23 between t22 and t24. For the time interval between t22 and t23, the deviation (A−TH)>"0", and thus the second throttle opening velocity Δθ2, which is proportional to the acceleration opening amount A, is selected owing to the presence of the decision-instruction indicative of Δθ1>Δθ2. The selected throttle opening velocity Δθ2 decreases gradually due to the decrease in the acceleration opening amount A, with the result that the throttle opening amount TH tends to increase in the form of an upwardly-curved quadratic curve, between t22 and t23. That is, the time point t22 corresponds to an inflection point of the throttle opening amount TH. For the time interval between t23 and t24, the deviation (A−TH) becomes below "0", since the accelerator opening amount A is below the throttle opening amount TH. In response to the decision-instruction indicative of Δθ1<Δθ2, the first throttle opening velocity Δθ 1, which is calculated as a function of the deviation (A−TH), is selected. In this case, the selected throttle opening velocity Δθ is a minus value, since the first throttle opening velocity Δθ1 is a negative value owing to the minus deviation. Thus, the current value θ*(n) of the target sub-throttle opening amount becomes less than the previous value θ*(n−1), and as a result the actual opening amount of the sub-throttle 44 is gradually decreased. Suppose that the accelerator opening amount A increases again owing to the depression of the accelerator pedal at the time t24, and the accelerator opening amount A becomes equal to the throttle opening amount TH at the time t25. For the time interval between t24 and t25, the deviation (A−TH) remains below "0", since the accelerator opening amount A is below the throttle opening amount TH. Thus, owing to the presence of the decision-instruction indicative of Δθ1<Δθ2, the first throttle opening velocity Δθ1 (a minus value) is selected as the current value Δθ of the throttle opening velocity. Owing to the minus deviation, the actual opening amount of the sub-throttle 44 is gradually decreased. On the other hand, when an inequality A>TH is satisfied after the time t25, the deviation (A−TH) is above "0", and the throttle opening amount TH of the sub-throttle 44 is gradually increased again at a second throttle opening velocity $\Delta\theta2$, in the same manner as the control operation executed between t21 and t22. In the previously-explained third embodiment, since the sub-throttle opening can be increasingly or decreasingly controlled more precisely in synchronization with the accelerator-pedal work of the driver, the state of the drive-wheel slip amount S(n) below the reference slip amount $S_0$, will continue for a while. However, as soon as the slip amount S(n) exceeds the reference slip amount $S_0$, the usual slip-suppression control is started in the same manner as the control operation executed after the time t4 of FIG. 7(c) in the first embodiment. As seen in FIG. 12, in the event that the veteran driver properly adjusts the depression of the accelerator pedal during acceleration-starting at the snow mode on a low$\mu$ road, the sub-throttle opening as well as the main throttle opening can be controlled more precisely in response to the accelerator opening amount A. The traction control system of the third embodiment may be superior to that of the second embodiment, in that the throttle opening velocity $\Delta\theta$ of the sub-throttle 44 can be optimally selected in consideration of the deviation between the accelerator opening amount and the actual sub-throttle opening amount, as well as the accelerator opening amount, and thus the system of the third embodiment can suppress acceleration-slip more precisely depending on the accelerator-pedal work of the veteran driver during acceleration-starting.

In the previously-explained three embodiments, although the target sub-throttle opening amount $\theta^*(n)$ is set at "0" under a particular condition in which a friction coefficient $\mu$ of the road surface is low, the vehicle speed is low, and additionally the accelerator opening amount is great, it is not always necessary to initialize the target sub-throttle opening amount $\theta^*(n)$ to "0" when beginning the slow opening control of the sub-throttle. Upon initiation of the slow opening control, the target sub-throttle opening amount $\theta^*(n)$ may be set to a small value nearly equal to zero in order to provide essentially the same effects as the previously-noted embodiments.

As will be appreciated from the above, according to the present invention, even when the driver depresses an accelerator pedal rapidly under a particular condition in which acceleration-slip tends to occur easily and additionally the amount of the acceleration-slip cannot be reduced easily, for example when starting quickly on low-$\mu$ roads, a sub-throttle opening is set to be equal to or nearly equal to zero once and then the sub-throttle opening increases slowly by way of a slow opening control for the sub-throttle provided upstream of a main throttle, and as a result the engine-power output can be increased slowly under the above-noted particular condition, irrespective of rapid depression of the accelerator pedal, thus effectively suppressing acceleration-slip. During the slow opening control, an opening velocity of the sub-throttle can be properly selected depending on an accelerator opening amount (an accelerator-pedal work of the driver) and/or a deviation between the accelerator opening amount and an actual opening amount of the sub-throttle, or depending on a friction coefficient$\mu$ of the road surface on which the car is traveling actually, and whereby the system of the present invention can provide a superior acceleration performance according to the driver's intention of accelerating, by effectively suppressing undesired acceleration-slip, even when starting quickly on low-$\mu$ roads for example.

In the shown embodiments, although the traction control system of the present invention is exemplified in case of a rear-wheel drive vehicle with an automatic transmission, the system of the invention may be applied to an automobile with a manual transmission. Although a slip amount or a slip ratio at drive wheels is derived on the basis of a wheel speed of drive wheels and a wheel speed of non-driven wheels in the embodiments, the slip amount (the slip rate) may be derived in various known ways. For example, an estimated vehicle speed called a projected vehicle speed or a pseudo vehicle speed, which is often used for an anti-skid brake control, may be used as a reference vehicle speed necessary for calculation of a slip ratio. In usual way, the projected vehicle speed can be derived by summing a time dependent acceleration and deceleration value, which is obtained by integration of a vehicular acceleration/deceleration gradient indicative data, and a latched wheel speed data, which is periodically updated. One such a technique for derivation of a projected or pseudo vehicle speed has been disclosed in U.S. Pat. No. 5,003,481, issued Mar. 26, 1991 to Toshiro Matsuda and commonly assigned to the assignee to the present invention. The teachings of the above-listed U.S. Pat. No. 5,003,481 are hereby incorporated by reference for the sake of disclosure.

It will be appreciated that the traction control system of the present invention can be applied to a front-wheel drive vehicle or a four-wheel drive vehicle and/or can be used in combination with a conventional acceleration-slip control system related to a braking-force control. Preferably, the above-noted pseudo vehicle speed may be used in case that the traction control system of the invention is applied to a four-wheel drive vehicle.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automobile traction control system in combination with a throttle control system of an internal combustion engine for controlling traction of drive wheels, comprising:

means for detecting a slip amount of the drive wheel and for producing a slip-amount indicative signal value;

control means responsive to said slip-amount indicative signal value for controlling an opening amount of a throttle of the engine to reduce an engine-power irrespective of an accelerator pedal work when said slip-amount indicative signal value exceeds a predetermined threshold;

means for detecting a vehicle speed and for producing a vehicle-speed indicative signal value;

means for detecting an opening amount of the accelerator and for producing an accelerator-opening-amount indicative signal value; and means for detecting a friction coefficient of a road surface and for producing a friction-coefficient indicative signal value, wherein said control means responsive to a particular condition in which said vehicle-speed indicative signal value is below a predetermined low speed, said accelerator-opening-amount indicative signal value is above a predetermined amount, and said friction-coefficient indicative signal value is below a predetermined low friction coefficient for reducing the opening amount of said throttle to a predetermined value irrespective of said slip-amount indicative signal value, in presence of said particular condition.

2. An automobile traction control system in combination with a throttle control system of an internal combustion engine for controlling traction of drive wheels, comprising:

a sub-throttle disposed upstream of a main throttle linked to an accelerator pedal, for adjusting an engine-power by varying an opening amount of said sub-throttle;

means for detecting a slip amount of the drive wheel and for producing a slip-amount indicative signal value;

control means responsive to said slip-amount indicative signal value for controlling the opening amount of said sub-throttle to reduce an engine-power irrespective of an accelerator pedal work when said slip-amount indicative signal value exceeds a predetermined threshold;

means for detecting a vehicle speed and for producing a vehicle-speed indicative signal value;

means for detecting an opening amount of the accelerator and for producing an accelerator-opening-amount indicative signal value; and means for detecting a friction coefficient of a road surface and for producing a friction-coefficient indicative signal value, wherein said control means responsive to a particular condition in which said vehicle-speed indicative signal value is below a predetermined low speed, said accelerator-opening-amount indicative signal value is above a predetermined amount, and said friction-coefficient indicative signal value is below a predetermined low friction coefficient, for increasing the opening amount of said sub-throttle slowly, after adjusting the opening amount of said sub-throttle to a predetermined low value nearly equal to irrespective of said slip-amount indicative signal value, in presence of said particular condition.

3. An automobile traction control system as set forth in claim 2, wherein said predetermined low value is a minimum value substantially corresponding to a substantially closed position of said sub-throttle, and wherein said control means slowly increases the opening amount of said sub-throttle at a throttle-opening velocity based on said friction-coefficient indicative signal value and said accelerator-opening-amount indicative signal value from said predetermined low value in presence of said particular condition.

4. An automobile traction control system as set forth in claim 3, wherein said throttle-opening velocity is calculated by multiplying said accelerator-opening-amount indicative signal value by a friction-coefficient dependent proportional gain, and said friction-coefficient dependent proportional gain is set at a smaller value when said friction-coefficient indicative signal value is below said predetermined low friction coefficient.

5. An automobile traction control system as set forth in claim 2, wherein said predetermined low value is a minimum value substantially corresponding to a substantially closed position of said sub-throttle, and wherein said control means slowly increases the opening amount of said sub-throttle at a throttle-opening velocity based on a variation of said accelerator-opening-amount indicative signal value from said predetermined low value in presence of said particular condition.

6. An automobile traction control system as set forth in claim 5, wherein said throttle-opening velocity is fixed to a predetermined upper limit when said variation is above a predetermined threshold, and said throttle-opening velocity is proportional to said variation when said variation is below said predetermined threshold.

7. An automobile traction control system as set forth in claim 2, wherein said predetermined low value is a percentage of full throttle opening substantially corresponding to a substantially closed position of said sub-throttle, and wherein said control means slowly increases the opening amount of said sub-throttle at a throttle-opening velocity based on said friction-coefficient indicative signal value and said accelerator-opening-amount indicative signal value from said predetermined low value in presence of said particular condition.

8. An automobile traction control system as set forth in claim 2, wherein said predetermined low value is a percentage of full throttle opening substantially corresponding to a substantially closed position of said sub-throttle, and wherein said control means slowly increases the opening amount of said sub-throttle at a throttle-opening velocity based on a variation of said accelerator-opening-amount indicative signal value from said predetermined low value in presence of said particular condition.

9. An automobile traction control system in combination with a throttle control system of an internal combustion engine for controlling traction of drive wheels, comprising:

a sub-throttle disposed upstream of a main throttle linked to an accelerator pedal, for adjusting an engine-power by varying an opening amount of said sub-throttle;

means for detecting a slip amount of the drive wheel and for producing a slip-amount indicative signal value;

control means responsive to said slip-amount indicative signal value for controlling the opening amount of said sub-throttle to reduce an engine-power irrespective of an accelerator pedal work when said slip-amount indicative signal value exceeds a predetermined threshold;

means for detecting a vehicle speed and for producing a vehicle-speed indicative signal value;

means for detecting an opening amount of the accelerator and for producing an accelerator-opening-amount indicative signal value;

means for detecting an actual opening amount of said sub-throttle and for producing a throttle-opening-amount indicative signal value; and means for detecting a friction coefficient of a road surface and for producing a friction-coefficient indicative signal value, wherein said control means responsive to a particular condition in which said vehicle-speed indicative signal value is below a predetermined low speed, said accelerator-opening-amount indicative signal value is above a predetermined amount, and said friction-coefficient indicative signal value is below a predetermined low friction coefficient, for slowly increasing the opening amount of said sub-throttle at a first throttle-opening velocity based on a deviation between said accelerator-opening-amount indicative signal value and said throttle-opening-amount indicative signal value or at a second throttle-opening velocity based on only said accelerator-opening-amount indicative signal value, after adjusting the opening amount of said sub-throttle to a value substantially corresponding to a substantially closed position of said sub-throttle irrespective of said slip-amount indicative signal value, in presence of said particular condition.

10. An automobile traction control system as set forth in claim 9, wherein under said particular condition, said sub-throttle is slowly opened at a lower speed of said first and second throttle-opening velocities.

11. An automobile traction control system as set forth in claim 9, wherein said friction-coefficient indicative signal value is derived as a function of said slip-amount indicative signal value and a longitudinal acceleration exerted on a vehicle.

12. An automobile traction control system in combination with a throttle control system of an internal combustion engine for controlling traction of drive wheels, comprising:

a sub-throttle disposed upstream of a main throttle linked to an accelerator pedal, for adjusting an engine-power by varying an opening amount of said sub-throttle;

means for detecting a slip amount of the drive wheel and for producing a slip-amount indicative signal value;

means for detecting a vehicle speed and for producing a vehicle-speed indicative signal value;

means for detecting an opening amount of the accelerator and for producing an accelerator-opening-amount indicative signal value;

means for detecting a friction coefficient of a road surface and for producing a friction-coefficient indicative signal value;

control means for controlling the opening amount of said sub-throttle at a first mode in which the opening amount of said sub-throttle is increased slowly at a restricted throttle-opening velocity from a predetermined value irrespective of said slip-amount indicative signal value, under a particular condition in which said vehicle-speed indicative signal value is below a predetermined low speed, said accelerator-opening-amount indicative signal value is above a predetermined amount, and said friction-coefficient indicative signal value is below a predetermined low friction coefficient; and said control means controlling the opening amount of said sub-throttle at a second mode except said particular condition in which mode the opening amount of said sub-throttle is controlled to reduce said slip-amount indicative signal value toward a target slip amount when said slip-amount indicative signal value exceeds a predetermined threshold.

13. An automobile traction control system as set forth in claim 12, wherein said control means operating in said first mode by increasing the opening amount of said sub-throttle from a minimum value substantially corresponding to a substantially closed position of said sub-throttle.

14. An automobile traction control system as set forth in claim 12, wherein said control means operating in said first mode by increasing the opening amount of said sub-throttle from a percentage of full throttle opening substantially corresponding a substantially closed position of said sub-throttle.

* * * * *